United States Patent
Yang et al.

(10) Patent No.: US 10,779,209 B2
(45) Date of Patent: Sep. 15, 2020

(54) HANDOFF METHOD

(71) Applicant: Guangdong OPPO Mobile Telecommunications Corp., Ltd., Dongguan, Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/493,290

(22) PCT Filed: Mar. 23, 2017

(86) PCT No.: PCT/CN2017/077926
§ 371 (c)(1),
(2) Date: Sep. 11, 2019

(87) PCT Pub. No.: WO2018/170853
PCT Pub. Date: Sep. 27, 2018

(65) Prior Publication Data
US 2020/0008117 A1    Jan. 2, 2020

(51) Int. Cl.
*H04W 36/30* (2009.01)
*H04W 76/27* (2018.01)
(Continued)

(52) U.S. Cl.
CPC . *H04W 36/00837* (2018.08); *H04W 36/0009* (2018.08); *H04W 36/0058* (2018.08);
(Continued)

(58) Field of Classification Search
CPC ... H04W 76/14; H04W 36/28; H04W 72/042; H04W 36/0005; H04W 36/00;
(Continued)

(56) References Cited

U.S. PATENT DOCUMENTS 7,254,393 B2 * 8/2007 Marque-Pucheu ... H04W 36/30
    370/321
8,135,407 B2 * 3/2012 Fallgren .............. H04W 36/30
    455/226.1
(Continued)

FOREIGN PATENT DOCUMENTS

| CN | 103200634 A | 7/2013 |
|---|---|---|
| CN | 103582043 A | 2/2014 |

(Continued)

OTHER PUBLICATIONS

Extended EP Search Report dated Nov. 21, 2019.
(Continued)

*Primary Examiner* — William D Cumming

(57) ABSTRACT

A handover method, a network device, and a terminal device are provided. The method includes: a first network device acquires measurement results of links, wherein the links include a link between the first network device and a first terminal device and a link between the first network device and a second terminal device; and the first network device determines at least one of a first handover scheme of the first terminal device, or a second handover scheme of the second terminal device according to the measurement results.

17 Claims, 11 Drawing Sheets

(51) Int. Cl.
  *H04W 24/10* (2009.01)
  *H04W 4/80* (2018.01)
  *H04W 36/28* (2009.01)
  *H04W 76/14* (2018.01)
  *H04W 36/00* (2009.01)
  *H04W 76/34* (2018.01)
  *H04W 88/04* (2009.01)

(52) U.S. Cl.
  CPC ....... *H04W 36/0072* (2013.01); *H04W 76/34* (2018.02); *H04W 88/04* (2013.01)

(58) Field of Classification Search
  CPC ............. H04W 36/0088; H04W 24/10; H04W 36/0072; H04W 36/0009; H04W 36/30; H04W 76/27
  USPC ....... 455/41.1, 425, 436; 370/315, 331, 216, 370/321
  See application file for complete search history.

(56) References Cited

U.S. PATENT DOCUMENTS

| | | | | |
|---|---|---|---|---|
| 8,200,224 | B2* | 6/2012 | Grob-Lipski | H04W 36/0088 370/216 |
| 8,412,182 | B2* | 4/2013 | Moberg | H04W 24/10 455/425 |
| 8,942,626 | B2* | 1/2015 | Cho | H04W 76/14 455/41.1 |
| 9,544,819 | B2* | 1/2017 | Cho | H04W 76/14 |
| 9,826,438 | B2* | 11/2017 | Cho | H04W 76/14 |
| 2004/0097231 | A1* | 5/2004 | Marque-Pucheu | H04W 36/30 455/436 |
| 2009/0239536 | A1* | 9/2009 | Fallgren | H04W 36/30 455/436 |
| 2010/0167744 | A1* | 7/2010 | Grob-Lipski | H04W 36/0088 455/436 |
| 2011/0009116 | A1 | 1/2011 | Moberg et al. | |
| 2012/0309309 | A1* | 12/2012 | Cho | H04W 4/80 455/41.1 |
| 2015/0092663 | A1* | 4/2015 | Cho | H04B 7/14 370/315 |
| 2016/0205495 | A1* | 7/2016 | Hu | H04W 48/02 370/331 |
| 2016/0242090 | A1* | 8/2016 | Chen | H04W 36/28 |
| 2017/0070916 | A1* | 3/2017 | Cho | H04W 4/80 |
| 2019/0159097 | A1* | 5/2019 | Tang | H04W 76/27 |
| 2019/0215733 | A1* | 7/2019 | Wang | H04W 36/0009 |
| 2020/0008117 | A1* | 1/2020 | Yang | H04W 36/0072 |

FOREIGN PATENT DOCUMENTS

| | | |
|---|---|---|
| CN | 105657643 A | 6/2016 |
| RU | 2524925 C2 | 8/2014 |
| WO | 2013044864 A1 | 4/2013 |

OTHER PUBLICATIONS

3GPP TSG-RAN WG2 Meeting #95bis; R2166796; Kaohsiung; Oct. 10-14, 2016.
3GPP TSG-RAN WG2 Meeting #97; R21700792; Athens, Greece; Feb. 13-17, 2017.
3GPP TSG-RAN WG2 Meeting #97; R21701270; Athens, Greece; Feb. 13-17, 2017.
3GPP TSG-RAN WG2 Meeting #97; R21701834; Athens, Greece; Feb. 13-17, 2017.
3GPP TSG-RAN WG2 Meeting #97; R21701970, resubmission of R2168770; Athens, Greece; Feb. 13-17, 2017.
3GPP TSG-RAN 2 Meeting #97bis; R21702536; Spokane, USA; Apr. 3-7, 2017.
English translation of Russia OA No. 2019132478/07 (063863) dated Jun. 25, 2020.

* cited by examiner

400

A first network device acquires measurement results of links, and the links include a link between the first network device and a first terminal device and a link between the first network device and a second terminal device ~410

The first network device determines a first handover scheme of the first terminal device and/or a second handover scheme of the second terminal device according to the measurement results ~420

A first terminal device acquires measurement results of links, and the links include a link between the first terminal device and a first network device and a link between the first network device and a second terminal device ~510

The first terminal device sends the measurement results to the first network device, and the measurement results are used for the first network device to determine a first handover scheme of the first terminal device ~520

The first terminal device receives a handover command and performs the first handover scheme according to the handover command ~530

- A second terminal device acquires a measurement result of a link, wherein the link includes a measurement result of a link between the second terminal device and a first network device — 610

- The second terminal device sends the measurement result to the first network device through a first terminal device, and the measurement result is used for the first network device to determine a second handover scheme of the second terminal device — 620

- The second terminal device receives a handover command and performs the second handover scheme according to the handover command — 630

- A second network device receives a handover request message sent by a first network device, and the handover request message is used for indicating that a first terminal device requests for performing a first handover scheme and a second terminal device requests for performing a second handover scheme — 710

- The second network device sends a handover command to the first network device according to the handover request message — 720

FIG. 7

HANDOFF METHOD

CROSS-REFERENCE TO RELATED APPLICATION(S)

This application is a 371 application of International Application No. PCT/CN2017/077926, filed on Mar. 23, 2017, the entire disclosure of which is hereby incorporated by reference.

TECHNICAL FIELD

Implementations of the present disclosure relate to the field of wireless communication, and more particularly relate to a handover method, a network device, and a terminal device.

BACKGROUND

In an existing wireless communication system, a Remote User Equipment (Remote UE), such as a wearable device, may transmit data through a Relay User Equipment (Relay UE), such as an existing common mobile phone user equipment. As shown in FIG. 1, a Relay UE may help a Remote UE to complete data transmission. As shown in FIG. 2A and FIG. 2B, a Relay UE and a Remote UE may establish a control plane connection through the same base station or different base stations, while the Relay UE helps the Remote UE to complete data forwarding. At this time, if the Relay UE or the Remote UE moves, the base station(s) will be required to carry out handover to ensure continuity of data transmission.

However, in practical applications, a Relay UE and a Remote UE are likely to be in the same location, e.g. both on a user. At this time, both the Relay UE and the Remote UE are likely to move in the same direction and at the same speed at the same time. If cell handover is required in the moving process, currently, a base station usually hands over the two UEs separately. As such, if the two UEs are handed over to cells covered by different base stations, relay transmission between the Relay UE and the Remote UE will be greatly affected.

SUMMARY

The implementations of the present disclosure provide a handover method, a network device.

In a first aspect, there is provided a handover method, including: acquiring, by a first network device, measurement results of links, wherein the links include a link between the first network device and a first terminal device and a link between the first network device and a second terminal device; and determining, by the first network device, a first handover scheme of the first terminal device and/or a second handover scheme of the second terminal device according to the measurement results.

Optionally, in one implementation of the first aspect, the links further include a link between the first terminal device and the second terminal device.

Optionally, in one implementation of the first aspect, determining, by the first network device, the first handover scheme of the first terminal device and/or the second handover scheme of the second terminal device according to the measurement results, includes: determining, by the first network device, the first handover scheme and/or the second handover scheme according to states of the first terminal device and the second terminal device and the measurement results.

Optionally, in one implementation of the first aspect, if the first terminal device is in a connected state, the first handover scheme includes that the first terminal device is handed over from a cell covered by the first network device to a cell covered by the second network device, or the first terminal device does not perform cell handover; if the first terminal device is in an inactive state or an idle state, the first handover scheme includes that the first terminal device reselects a cell covered by the second network device as a cell to be accessed, or the first terminal device does not perform cell reselection; if the second terminal device is in a connected state, the second handover scheme includes that the second terminal device is handed over from a cell covered by the first network device to a cell covered by the second network device or a cell covered by another network device, or the second terminal device does not perform cell handover; if the second terminal device is in an inactive state or an idle state, the second handover scheme includes that the second terminal device reselects a cell covered by the second network device or a cell covered by another network device as a cell to be accessed, or the second terminal device does not perform cell reselection.

Optionally, in one implementation of the first aspect, determining, by the first network device, the first handover scheme of the first terminal device and/or the second handover scheme of the second terminal device according to the measurement results, includes: determining, by the first network device, whether a link connection between the first terminal device and the second terminal device is maintained according to the measurement results; and determining, by the first network device, the first handover scheme and/or the second handover scheme according to whether the link connection between the first terminal device and the second terminal device is maintained.

Optionally, in one implementation of the first aspect, if the first network device determines that the link connection between the first terminal device and the second terminal device is maintained, after the first terminal device performs the first handover scheme and the second terminal device performs the second handover scheme, the first terminal device and the second terminal device are located in a cell covered by a same network device.

Optionally, in one implementation of the first aspect, the method further includes: determining, by the first network device, whether a link connection between the first terminal device and the second terminal device is maintained according to the measurement results; if the first network device determines that the link connection between the first terminal device and the second terminal device is not maintained, the method further includes: sending, by the first network device, release indication information to the first terminal device, wherein the release indication information is used for instructing the first terminal device to release the link connection with the second terminal device.

Optionally, in one implementation of the first aspect, before the first network device determines the first handover scheme of the first terminal device and/or the second handover scheme of the second terminal device according to the measurement results, the method further includes: acquiring, by the first network device, association information between the first terminal device and the second terminal device, wherein the association information includes a pairing relationship or a connection relationship between the first terminal device and the second terminal device; determining, by the first network device, the first handover scheme of the first terminal device and/or the second handover scheme of the second terminal device according to the measurement results, includes: determining, by the first network device, the first handover scheme and/or the second handover scheme according to the association information and the measurement results.

Optionally, in one implementation of the first aspect, if the first handover scheme includes that the first terminal device is handed over from a cell covered by the first network device to a cell covered by the second network device, the method further includes: sending, by the first network device, a handover request message to the second network device, wherein the handover request message is used for indicating that the first terminal device requests performing the first handover scheme; and receiving, by the first network device, a handover command sent by the second network device according to the handover request message, wherein the handover command includes a resource for cell handover of the first terminal device.

Optionally, in one implementation of the first aspect, the handover request message includes association information between the first terminal device and the second terminal device.

Optionally, in one implementation of the first aspect, if the second handover scheme includes that the second terminal device is handed over from a cell covered by the first network device to a cell covered by the second network device, the handover request message is further used for indicating that the second terminal device requests performing the second handover scheme, and the handover command further includes a resource for cell handover of the second terminal device.

Optionally, in one implementation of the first aspect, if the second handover scheme includes that the second terminal device reselects a cell covered by the second network device or a cell covered by another network device as a cell to be accessed, the handover request message is further used for indicating that the second terminal device requests performing the second handover scheme, and the handover command further includes information on whether the second terminal device is allowed to perform cell reselection.

Optionally, in one implementation of the first aspect, if the second network device allows the second terminal device to perform cell reselection, the handover command further includes information of a cell to be accessed reselected by the second terminal device.

Optionally, in one implementation of the first aspect, the first terminal device is a Relay UE and the second terminal device is a Remote UE; or the first terminal device is a Remote UE and the second terminal device is a Relay UE.

Optionally, in one implementation of the first aspect, the measurement result of a link includes a measurement result of a link quality of the link and/or a measurement result of a link state of the link.

Optionally, in one implementation of the first aspect, acquiring, by the first network device, the measurement results of the links, includes: receiving, by the first network device, the measurement results sent by the first terminal device; or receiving, by the first network device, a measurement result of a link between the first terminal device and the first network device sent by the first terminal device, and receiving a measurement result of a link between the second terminal device and the first network device sent by the second terminal device.

Optionally, in one implementation of the first aspect, acquiring, by the first network device, the measurement results of the links, includes: receiving, by the first network device, a measurement result of a link between the first terminal device and the second terminal device sent by the first terminal device or the second terminal device.

Optionally, in one implementation of the first aspect, acquiring, by the first network device, the measurement results of the links, includes: acquiring, by the first network device, a measurement result of a link carried in an adaptation layer or a direct connection interface protocol stack PC5 sent by the first terminal device or the second terminal device.

In a second aspect, there is provided a handover method, including: acquiring, by a first terminal device, measurement results of links, wherein the links include a link between the first terminal device and a first network device and a link between the first network device and a second terminal device; sending, by the first terminal device, the measurement results to the first network device, wherein the measurement results are used for the first network device to determine a first handover scheme of the first terminal device; and receiving, by the first terminal device, a handover command and performing the first handover scheme according to the handover command.

Optionally, in one implementation of the second aspect, the links further include a link between the first terminal device and the second terminal device.

Optionally, in one implementation of the second aspect, the first handover scheme includes that the first terminal device is handed over from a cell covered by the first network device to a cell covered by a second network device, or the first terminal device does not perform cell handover.

Optionally, in one implementation of the second aspect, if the first network device determines that a link connection between the first terminal device and the second terminal device is maintained, after the first terminal device performs the first handover scheme, the first terminal device and the second terminal device are located in a cell covered by a same network device.

Optionally, in one implementation of the second aspect, if the first network device determines that a link connection between the first terminal device and the second terminal device is not maintained, the method further includes: receiving, by the first terminal device, release indication information, and releasing, by the first terminal device, the link connection with the second terminal device according to the release indication information.

Optionally, in an implementation of the second aspect, the method further includes: acquiring, by the first terminal device, association information between the first terminal device and the second terminal device, wherein the association information includes a pairing relationship or a connection relationship between the first terminal device and the second terminal device; and sending, by the first terminal device, the association information to the first network device, and the first network device determines the first handover scheme according to the association information and the measurement results.

Optionally, in one implementation of the second aspect, if the first handover scheme includes that the first terminal device is handed over from a cell covered by the first network device to a cell covered by the second network device, the handover command further includes a resource for cell handover of the first terminal device.

Optionally, in one implementation of the second aspect, the first terminal device is a Relay UE and the second terminal device is a Remote UE; or the first terminal device is a Remote UE and the second terminal device is a Relay UE.

Optionally, in one implementation of the second aspect, the measurement result of a link includes a measurement result of a link quality of the link and/or a measurement result of a link state of the link.

Optionally, in one implementation of the second aspect, acquiring, by the first terminal device, the measurement results of the links, includes: determining, by the first terminal device, a measurement result of a link between the first terminal device and the first network device, and receiving a measurement result of a link between the first network device and the second terminal device sent by the second terminal device.

Optionally, in one implementation of the second aspect, acquiring, by the first terminal device, the measurement results of the links, includes: determining, by the first terminal device, a measurement result of a link between the first terminal device and the second terminal device; or receiving, by the first terminal device, a measurement result of a link between the first terminal device and the second terminal device sent by the second terminal device.

Optionally, in one implementation of the second aspect, acquiring, by the first terminal device, the measurement results of the links, includes: acquiring, by the first terminal device, a measurement result of a link carried in an adaptation layer or a direct connection interface protocol stack PC5 sent by the second terminal device.

In a third aspect, there is provided a handover method, including: acquiring, by a second terminal device, a measurement result of a link, wherein the link includes a link between the second terminal device and a first network device; sending, by the second terminal device, the measurement result to the first network device through a first terminal device, wherein the measurement result is used for the first network device to determine a second handover scheme of the second terminal device; and receiving, by the second terminal device, a handover command and performing the second handover scheme according to the handover command.

Optionally, in one implementation of the third aspect, the link further includes a link between the first terminal device and the second terminal device.

Optionally, in one implementation of the third aspect, the second handover scheme includes that the second terminal device reselects a cell covered by the second network device as a cell to be accessed, or the second terminal device does not perform cell reselection.

Optionally, in one implementation of the third aspect, if the first network device determines that a link connection between the first terminal device and the second terminal device is maintained, after the second terminal device performs the second handover scheme, the first terminal device and the second terminal device are located in a cell covered by a same network device.

Optionally, in one implementation of the third aspect, if the first network device determines that there is no need to maintain a link connection between the second terminal device and the first terminal device, the method further includes: receiving, by the second terminal device, release indication information and releasing the link connection with the first terminal device according to the release indication information.

Optionally, in one implementation of the third aspect, if the second handover scheme includes that the second terminal device reselects a cell covered by the second network device as a cell to be accessed, the handover command further includes information of a cell to be accessed reselected by the second terminal device.

Optionally, in one implementation of the third aspect, the first terminal device is a Relay UE and the second terminal device is a Remote UE; or the first terminal device is a Remote UE and the second terminal device is a Relay UE.

Optionally, in one implementation of the third aspect, the measurement result of a link includes a measurement result of a link quality of the link and/or a measurement result of a link state of the link.

Optionally, in one implementation of the third aspect, sending, by the second terminal device, the measurement result to the first network device through the first terminal device, includes: sending, by the second terminal device, the measurement result carried in an adaptation layer or a direct connection interface protocol stack PC5 to the first network device through the first terminal device.

Optionally, in one implementation of the third aspect, receiving, by the second terminal device, the handover command includes: receiving, by the second terminal device, the handover command sent by the first terminal device; or receiving, by the second terminal device, the handover command sent by the first network device through a paging message.

In a fourth aspect, there is provided a handover method, including: receiving, by a second network device, a handover request message sent by a first network device, wherein the handover request message is used for indicating that a first terminal device requests performing a first handover scheme and a second terminal device requests for performing a second handover scheme; and sending, by the second network device, a handover command to the first network device according to the handover request message.

Optionally, in one implementation of the fourth aspect, if the first terminal device is in a connected state, the first handover scheme includes that the first terminal device is handed over from a cell covered by the first network device to a cell covered by a second network device, or the first terminal device does not perform cell handover; if the first terminal device is in an inactive state or an idle state, the first handover scheme includes that the first terminal device reselects a cell covered by the second network device as a cell to be accessed, or the first terminal device does not perform cell reselection; if the second terminal device is in a connected state, the second handover scheme includes that the second terminal device is handed over from a cell covered by the first network device to a cell covered by the second network device or a cell covered by another network device, or the second terminal device does not perform cell handover; if the second terminal device is in an inactive state or an idle state, the second handover scheme includes that the second terminal device reselects a cell covered by the second network device or a cell covered by another network device as a cell to be accessed, or the second terminal device does not perform cell reselection.

Optionally, in one implementation of the fourth aspect, if the first handover scheme includes that the first terminal device is handed over from a cell covered by the first network device to a cell covered by the second network device, the handover command includes a resource for cell handover of the first terminal device.

Optionally, in one implementation of the fourth aspect, if the second handover scheme includes that the second terminal device is handed over from a cell covered by the first network device to a cell covered by the second network device, the handover command further includes a resource for cell handover of the second terminal device.

Optionally, in one implementation of the fourth aspect, if the second handover scheme includes that the second terminal device reselects a cell covered by the second network device as a cell to be accessed, the handover command further includes information on whether the second terminal device is allowed to perform cell reselection.

Optionally, in one implementation of the fourth aspect, if the second network device allows the second terminal device to perform cell reselection, the handover command further includes information of a cell to be accessed reselected by the second terminal device.

Optionally, in one implementation of the fourth aspect, the first terminal device is a Relay UE and the second terminal device is a Remote UE; or the first terminal device is a Remote UE and the second terminal device is a Relay UE.

In a fifth aspect, there is provided a network device that may perform operations of the network device in the first aspect or any optional implementation of the first aspect. Specifically, the network device may include modules used for performing operations of the network device in the first aspect or any possible implementation of the first aspect.

In a sixth aspect, there is provided a terminal device that may perform operations of the terminal device in the second aspect or any optional implementation of the second aspect. Specifically, the terminal device may include modules used for performing operations of the terminal device in the second aspect or any possible implementation of the second aspect.

In a seventh aspect, there is provided a terminal device that may perform operations of the terminal device in the third aspect or any optional implementation of the third aspect. Specifically, the terminal device may include modules used for performing operations of the terminal device in the third aspect or any possible implementation of the third aspect.

In an eighth aspect, there is provided a network device that may perform operations of the network device in the fourth aspect or any optional implementation of the fourth aspect. Specifically, the network device may include modules used for performing operations of the network device in the fourth aspect or any possible implementation of the fourth aspect.

In a ninth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the first aspect or any possible implementation of the first aspect, or the execution causes the network device to implement the network device provided in the fifth aspect.

In a tenth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the second aspect or any possible implementation of the second aspect, or the execution causes the terminal device to implement the terminal device provided in the sixth aspect.

In an eleventh aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the third aspect or any possible implementation of the third aspect, or the execution causes the terminal device to implement the terminal device provided in the seventh aspect.

In a twelfth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the fourth aspect or any possible implementation of the fourth aspect, or the execution causes the network device to implement the network device provided in the eighth aspect.

In a thirteenth aspect, there is provided a computer-readable storage medium storing a program that causes a network device to perform any one handover method of the first aspect and various implementations thereof.

In a fourteenth aspect, there is provided a computer-readable storage medium storing a program that causes a terminal device to perform any one handover method of the second aspect and various implementations thereof.

In a fifteenth aspect, there is provided a computer-readable storage medium storing a program that causes a terminal device to perform any one handover method of the third aspect and various implementations thereof.

In a sixteenth aspect, there is provided a computer-readable storage medium storing a program that causes a network device to perform any one handover method of the fourth aspect and various implementations thereof.

In a seventeenth aspect, there is provided a system chip, which includes an input interface, an output interface, a processor, and a memory, wherein the processor is used for executing instructions stored in the memory, and when the instructions are executed, the processor may implement any one method in the first aspect and various implementations thereof.

In an eighteenth aspect, there is provided a system chip, which includes an input interface, an output interface, a processor, and a memory, wherein the processor is used for executing instructions stored in the memory, and when the instructions are executed, the processor may implement any one method in the second aspect and various implementations thereof.

In a nineteenth aspect, there is provided a system chip, which includes an input interface, an output interface, a processor, and a memory, wherein the processor is used for executing instructions stored in the memory, and when the instructions are executed, the processor may implement any one method in the third aspect and various implementations thereof.

In a twentieth aspect, there is provided a system chip, which includes an input interface, an output interface, a processor, and a memory, wherein the processor is used for executing instructions stored in the memory, and when the instructions are executed, the processor may implement any one method in the fourth aspect and various implementations thereof.

BRIEF DESCRIPTION OF DRAWINGS

FIG. 4 is a schematic flow chart of a handover method according to an implementation of the present disclosure.

FIG. 5 is a schematic flow chart of a handover method according to an implementation of the present disclosure.

FIG. 6 is a schematic flow chart of a handover method according to an implementation of the present disclosure.

FIG. 7 is a schematic flow chart of a handover method according to an implementation of the present disclosure.

DETAILED DESCRIPTION

Hereinafter, technical solutions in the implementations of the present disclosure will be described with reference to the accompanying drawings.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with terminal devices in the present disclosure. The terminal devices may be referred to as user equipment (UE), access terminals, subscriber units, subscriber stations, mobile stations, mobile platforms, remote stations, remote terminals, mobile devices, user terminals, terminals, wireless communication devices, user agents or user devices. The access terminal may be a cellular phone, a cordless phone, a session initiation protocol (SIP) phone, a wireless local loop (WLL) station, a personal digital auxiliary (PDA), a handheld device with a wireless communication function, a computing device or other processing device connected to a wireless modem, a vehicle-mounted device, a wearable device, a terminal device in a future 5G network, or a terminal device in a future evolving public land mobile network (PLMN), etc.

Various implementations are described herein in connection with network devices in the present disclosure. A network device may be a device for communicating with a terminal device, such as a base station (Base Transceiver Station, referred to as "BTS") in a GSM system or CDMA, a base station (NodeB, referred to as "NB") in a WCDMA system, or an evolved base station (Evolutional Node B, referred to as "eNB" or "eNodeB") in a LTE system, or the network device may be a relay station, an access point, a vehicle-mounted device, a wearable device, a network side device in a future 5G network, or a network side device in a future evolved PLMN network, etc.

Figure 1:
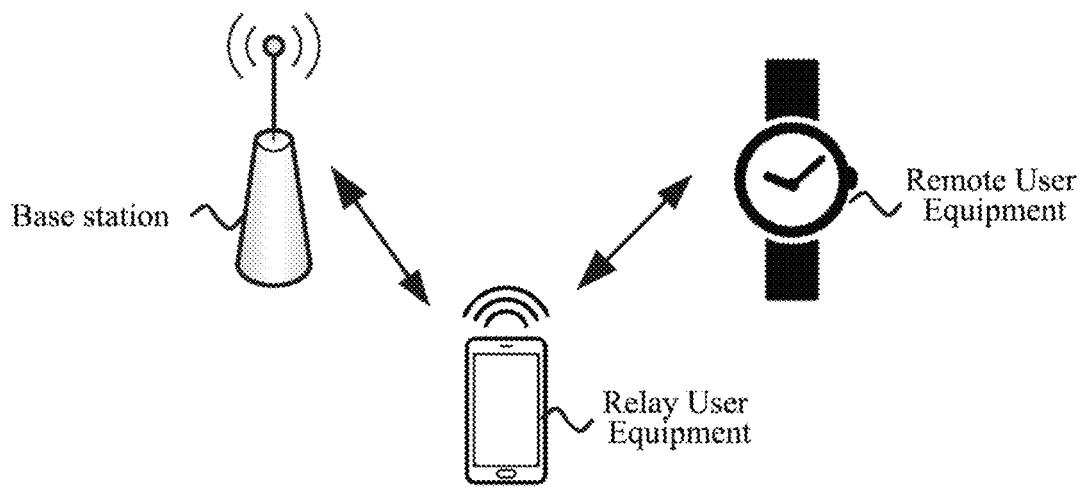
FIG. 1 is a schematic diagram of relay transmission of a terminal device in the prior art.
Figure 2A:
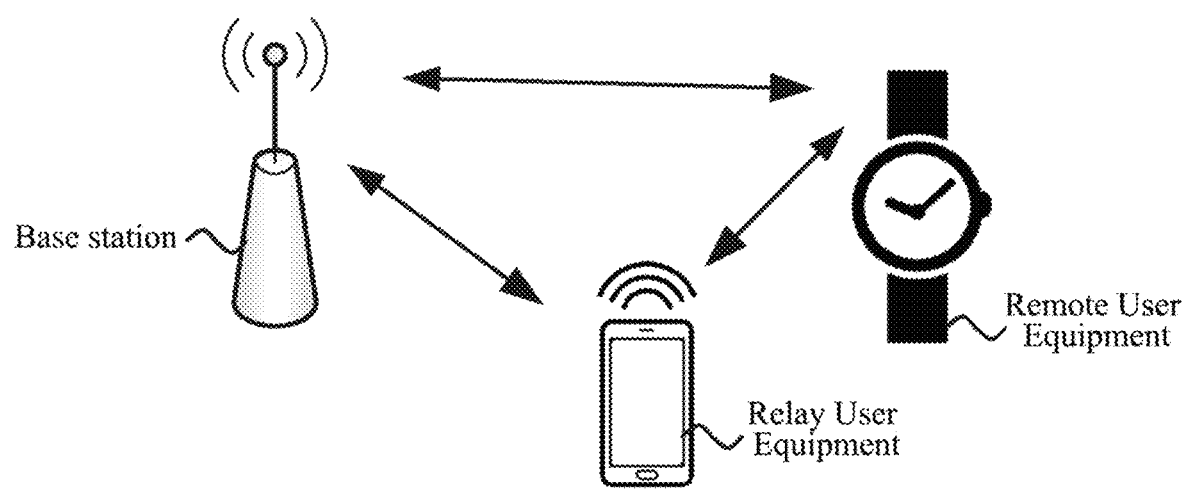
FIG. 2A is a schematic diagram of relay transmission of a terminal device in the prior art.
Figure 2B:
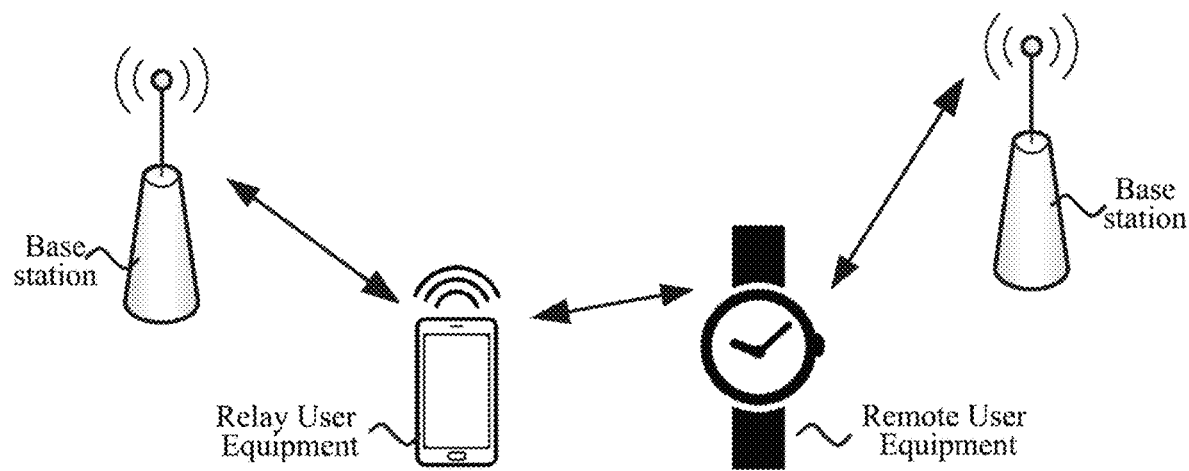
FIG. 2B is a schematic diagram of relay transmission of a terminal device in the prior art.
Figure 3:
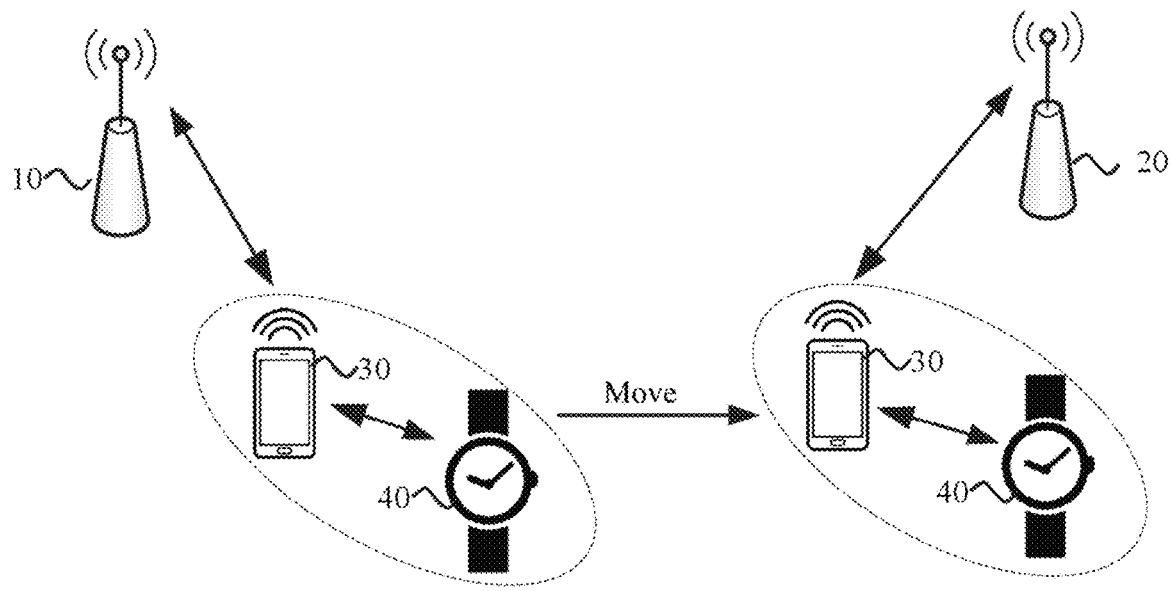
FIG. 3 is a schematic diagram of architecture of an application scenario according to an implementation of the present disclosure.

FIG. 3 is a schematic diagram of an application scenario of an implementation of the present disclosure. A communication system in FIG. 3 may include a network device 10, a network device 20, a terminal device 30, and a terminal device 40. The network device 10 is used for providing communication services for the terminal device 30 and the terminal device 40. The terminal device 40 is a Remote UE such as a watch, and the terminal device 30 is a Relay UE such as a mobile phone. The terminal device 40 may perform data transmission with the network device 10 through the terminal device 30. If the terminal device 30 and the terminal device 40 are located at the same location, for example, on a user, the two terminal devices will move in the same direction and at the same speed at the same time. If cell handover is required during the moving process, if the two terminal devices are handed over to cells covered by different network devices, relay transmission between the Relay UE and the Remote UE will be greatly affected. Therefore, when performing cell handover during the moving process of the two terminal devices, it is desirable for the terminal device 30 and the terminal device 40 to be handed over to a cell covered by the same network device. As shown in FIG. 3, the terminal device 30 and the terminal device 40 are handed over by the network device 10 to a cell covered by the network device 20, and then the terminal device 30 and the terminal device 40 may effectively perform normal relay transmission. Arrows shown in FIG. 3 may represent uplink/downlink transmission through cellular links between the terminal device 20 and the network device 10.

The network in the implementation of the present disclosure may refer to a Public Land Mobile Network (PLMN) or a device-to-device (D2D) network or a machine-to-machine/man (M2M) network or other networks. FIG. 3 is a simplified schematic diagram of an example, and other terminal devices may be included in the network and are not shown in FIG. 3.

FIG. 4 is a schematic flowchart of a handover method 400 according to an implementation of the present disclosure. The method may be performed by a first network device such as the network device 10 in FIG. 3. As shown in FIG. 4, the handover method includes acts 410 and 420.

In 410, a first network device acquires measurement results of links, and the links include a link between the first network device and a first terminal device and a link between the first network device and a second terminal device.

In 420, the first network device determines a first handover scheme of the first terminal device and/or a second handover scheme of the second terminal device according to the measurement results.

Optionally, at least one terminal device of the first terminal device and the second terminal device is in a connected state.

Optionally, the first terminal device is a Relay UE and the second terminal device is a Remote UE, or the first terminal device is a Remote UE and the second terminal device is a Relay UE.

Specifically, when the first terminal device and the second terminal device perform cell handover, the first network device may acquire a measurement result of a link between the first network device and the first terminal device and a measurement result of a link between the first network device and the second terminal device, and the measurement results of these links may be used to determine a first handover scheme for the first terminal device and a second handover scheme for the second terminal device. Since the first network device simultaneously acquires the measurement result of the link between the first terminal device and the first network device and the measurement result of the link between the second terminal device and the first network device, the first network device may comprehensively consider measurement results of multiple links when determining respective handover schemes for the first terminal device and the second terminal device, and try to select a cell covered by a same network device as a cell to be handed over to or a reselected cell to be accessed for the first terminal device and the second terminal device.

For example, if there is service data interaction between the first terminal device and the second terminal device, when cell handover is required in moving processes of the two terminal devices, the first network device will try to select a cell covered by an identical network device as a cell to be handed over to for the first terminal device and the second terminal device according to measurement results when determining a first handover scheme and a second handover scheme to ensure continuity of services of the terminal devices, although a signal intensity after handover is not optimal.

Optionally, the measurement results of the links acquired by the first network device may further include a measurement result of a link between the first terminal device and the second terminal device.

In other words, the first network device may not only acquire a measurement result of a link between the first network device and the first terminal device and a measurement result of a link between the first network device and the second terminal device, but also acquire a measurement result of a link between the first terminal device and the second terminal device, and determine a first handover scheme and a second handover scheme by comprehensively considering the measurement results of the three links. Since a link condition between the two terminal devices is considered, the two terminal devices may be tried to be handed over to a cell covered by an identical network device when necessary.

Optionally, the measurement result of a link includes a measurement result of a link quality of the link and/or a measurement result of a link state of the link.

Since the first terminal device may determine measurement results of links of the first terminal device, that is, a measurement result of a link between the first terminal device and the first network device, and a measurement result of a link between the first terminal device and the second terminal device, and the second terminal device may determine measurement results of links of the second terminal device, that is, a measurement result of a link between the second terminal device and the first network device, and a measurement result of a link between the second terminal device and the first terminal device, optionally, in 410, the first network device receives the measurement results transmitted by the first terminal device, or the first network device receives a measurement result of a link between the first terminal device and the first network device transmitted by the first terminal device and receives a measurement result of a link between the second terminal device and the first network device transmitted by the second terminal device.

Further, the first network device acquiring the measurement results of the links may further include: the first network device receiving a measurement result of a link between the first terminal device and the second terminal device transmitted by the first terminal device or the second terminal device.

Optionally, the first network device acquires the measurement results of the links, including: the first network device acquires a measurement result of a link carried in an adaptation layer or a direct connection interface protocol stack PC5 sent by the first terminal device or the second terminal device.

That is, information of interaction such as measurement results among the first terminal device, the second terminal device, and the first network device may be carried in an adaptation layer or in a signaling or data of an existing direct connection interface protocol stack PC5.

Optionally, in 410, the first network device determines the first handover scheme of the first terminal device and/or the second handover scheme of the second terminal device according to the measurement results, including: the first network device determines the first handover scheme and/or the second handover scheme according to states in which the first terminal device and the second terminal device are located and the measurement results.

Optionally, if the first terminal device is in a connected state, the first handover scheme includes that the first terminal device is handed over from a cell covered by the first network device to a cell covered by the second network device, or the first terminal device does not perform cell handover; if the first terminal device is in an inactive state or an idle state, the first handover scheme includes that the first terminal device reselects a cell covered by the second network device as a cell to be accessed, or the first terminal device does not perform cell reselection; if the second terminal device is in a connected state, the second handover scheme includes that the second terminal device is handed over from a cell covered by the first network device to a cell covered by the second network device or a cell covered by another network device, or the second terminal device does not perform cell handover; if the second terminal device is in an inactive state or an idle state, the second handover scheme includes that the second terminal device reselects a cell covered by the second network device or a cell covered by another network device as a cell to be accessed, or the second terminal device does not perform cell reselection.

Here, if the first handover scheme causes the first terminal device to be handed over to or reselect a cell covered by the second network device, the second handover scheme may cause the second terminal device to be handed over to or reselect a cell covered by the same network device as the first terminal device, i.e., the second network device, but if a condition of a signal intensity is not allowed, or the first terminal device and the second terminal device do not need to maintain a link connection, should not maintain a link connection or are not suitable to continue to maintain a link connection, the second terminal device may be handed over to a cell covered by another network device or reselect a cell covered by another network device as a cell to be accessed.

Optionally, the first network device determines the first handover scheme of the first terminal device and/or the second handover scheme of the second terminal device according to the measurement results, including: the first network device determines whether a link connection between the first terminal device and the second terminal device is maintained according to the measurement results; and the first network device determines the first handover scheme and/or the second handover scheme according to whether the link connection between the first terminal device and the second terminal device is maintained.

Further, if the first network device determines that the link connection between the first terminal device and the second terminal device is maintained, after the first terminal device performs the first handover scheme and the second terminal device performs the second handover scheme, the first terminal device and the second terminal device are located in a cell covered by a same network device.

Specifically, if the first network device determines that the link connection between the first terminal device and the second terminal device is maintained, for example, the first network device determines that the link connection between the first terminal device and the second terminal device should be maintained, or the link connection needs to be maintained continuously, the first handover scheme and/or the second handover scheme determined by the first network device will enable the first terminal device and the second terminal device to be located in a cell covered by a same network device after the first terminal device performs the first handover scheme and the second terminal device performs the second handover scheme.

If the first network device determines that the link connection between the first terminal device and the second terminal device is not maintained, for example, the first network device determines that the link connection between the first terminal device and the second terminal device should not be maintained, or that the link connection does not need to be maintained, or that a signal intensity cannot meet a link requirement between the first terminal device and the second terminal device, then the first handover scheme and/or the second handover scheme determined by the first network device may enable the first terminal device and the second terminal device to be located in a cell covered by a same network device or in cells covered by different network devices after the first terminal device performs the first handover scheme and the second terminal device performs the second handover scheme.

Optionally, the method further includes: the first network device determines whether a link connection between the first terminal device and the second terminal device is maintained according to the measurement results; if the first network device determines that the link connection between the first terminal device and the second terminal device is not maintained, the method further includes: the first network device sends release indication information to the first terminal device, and the release indication information is used for instructing the first terminal device to release the link connection with the second terminal device.

Optionally, before the act 420, that is, before the first network device determines the first handover scheme of the first terminal device and/or the second handover scheme of the second terminal device according to the measurement results, the method further includes: the first network device acquires association information between the first terminal device and the second terminal device, wherein the association information includes a pairing relationship or a connection relationship between the first terminal device and the second terminal device.

The first network device determines the first handover scheme of the first terminal device and/or the second handover scheme of the second terminal device according to the measurement results, including: the first network device determines the first handover scheme and/or the second handover scheme according to the association information and the measurement results.

Specifically, the first network device may determine the first handover scheme and/or the second handover scheme according to the pairing relationship or connection relationship between the first terminal device and the second terminal device and the measurement results of the links. For example, if the first terminal device and the second terminal device are in a connection relationship and have data interaction, then when determining the first handover scheme and/or the second handover scheme, the first network device will try to select a cell covered by an identical network device as a cell to be handed over to or a reselected cell to be accessed for the first terminal device and the second terminal device according to the measurement results, although a signal intensity after handover is not optimal.

Optionally, if the first handover scheme includes that the first terminal device is handed over from a cell covered by the first network device to a cell covered by the second network device, the method further includes: the first network device sends a handover request message to the second network device, wherein the handover request message is used for indicating that the first terminal device requests performing the first handover scheme; the first network device receives a handover command sent by the second network device according to the handover request message, and the handover command includes a resource for cell handover of the first terminal device.

After receiving the handover command, the first network device may give a handover instruction to the first terminal device, so that the first terminal device is handed over to a cell covered by the second network device according to the resource configured by the second network device for the first terminal device for cell handover.

The handover request message may include association information between the first terminal device and the second terminal device and/or a context of the first terminal device.

The association information may be used by the second network device to determine whether the first terminal device is allowed to be handed over to a cell covered by the second network device, and if so, a handover command is issued, wherein the resource configured for the first terminal device for cell handover is carried in the handover command.

Optionally, if the second handover scheme includes that the second terminal device is handed over from a cell covered by the first network device to a cell covered by the second network device, the handover request message is further used for indicating that the second terminal device requests performing the second handover scheme, and the handover command further includes a resource for cell handover of the second terminal device.

After receiving the handover command, the first network device may give a handover instruction to the second terminal device to enable the second terminal device to be handed over to a cell covered by the second network device according to the resource configured by the second network device for the second terminal device for cell handover.

The handover request message may further include a context of the second terminal device.

Optionally, if the second handover scheme includes that the second terminal device reselects a cell covered by the second network device or a cell covered by another network device as a cell to be accessed, the handover request message is further used for indicating that the second terminal device requests performing the second handover scheme, and the handover command further includes information on whether the second terminal device is allowed to perform cell reselection.

If the second network device allows the second terminal device to reselect a cell, the handover command may further include information of a cell to be accessed reselected by the second terminal device.

After receiving the handover command, the first network device may send the information of the cell to be accessed reselected by the second terminal device to the second terminal device through the first terminal device.

In the implementation of the present disclosure, the network device determines handover schemes of the two terminal devices by acquiring link information of the Relay UE and link information of the Remote UE, to try to make the two terminal devices be located in a cell covered by a same network device after cell handover or cell reselection, thus effective relay transmission may be continued between the Relay UE and the Remote UE after the Relay UE and the Remote UE perform cell handover.

FIG. 5 is a schematic flow chart of a handover method 500 according to an implementation of the present disclosure. The method may be performed by a first terminal device, which may be a Relay UE such as the terminal device 30 in FIG. 3 or a Remote UE such as the terminal device 40 in FIG. 3. As shown in FIG. 5, the handover method includes acts 510-530.

In 510, a first terminal device acquires measurement results of links, and the links include a link between the first terminal device and a first network device and a link between the first network device and a second terminal device.

In 520, the first terminal device sends the measurement results to the first network device, and the measurement results are used for the first network device to determine a first handover scheme of the first terminal device.

In 530, the first terminal device receives a handover command and performs the first handover scheme according to the handover command.

Optionally, the first terminal device is in a connected state.

Optionally, the first terminal device is a Relay UE and the second terminal device is a Remote UE, or the first terminal device is a Remote UE and the second terminal device is a Relay UE.

Specifically, when the second terminal device performs cell handover, the first terminal device acquires a measurement result of a link between the first terminal device and the first network device and reports the measurement result to the first network device, so that the first network device determines a first handover scheme for the first terminal device or may further determine a second handover scheme for the second terminal device according to the measurement result of the link between the first network device and the first terminal device and a measurement result of a link between the first network device and the second terminal device received from the second terminal device. Since the first network device acquires the measurement result of the link between the first terminal device and the first network device and the measurement result of the link between the second terminal device and the first network device at the same time, the first network device may comprehensively consider measurement results of multiple links when determining a handover scheme for the first terminal device, and try to select a cell covered by the same network device as the second terminal device as a cell to be handed over to for the first terminal device.

Optionally, the measurement results of the links acquired by the first terminal device may further include a measurement result of a link between the first terminal device and the second terminal device.

In other words, the first terminal device may not only acquire a measurement result of a link between the first network device and the first terminal device and a measurement result of a link between the first network device and the second terminal device, but also acquire a measurement result of a link between the first terminal device and the second terminal device, and the first handover scheme and the second handover scheme are determined by comprehensively considering the measurement results of the three links. Since a link condition between the two terminal devices is considered, the two terminal devices may be tried to be handed over to a cell covered by an identical network device when necessary.

Optionally, the measurement result of a link includes a measurement result of a link quality of the link and/or a measurement result of a link state of the link.

Optionally, in 510, the first terminal device acquires the measurement results of the links, including: the first terminal device determines a measurement result of a link between the first terminal device and the first network device, and receives a measurement result of a link between the first network device and the second terminal device sent by the second terminal device.

Further, the first terminal device acquires the measurement results of the links, further including: the first terminal device determines a measurement result of a link between the first terminal device and the second terminal device; or the first terminal device receives a measurement result of a link between the first terminal device and the second terminal device sent by the second terminal device.

Optionally, the first terminal device acquires the measurement results of the links, including: the first terminal device acquires a measurement result of a link carried in an adaptation layer or a direct connection interface protocol stack PC5 sent by the second terminal device.

That is, information of interaction such as measurement results among the first terminal device, the second terminal device, and the first network device may be carried in an adaptation layer or in a signaling or data of an existing direct connection interface protocol stack PC5.

Optionally, in 520, the first handover scheme determined by the first network device for the first terminal device includes that the first terminal device switches from a cell covered by the first network device to a cell covered by the second network device, or the first terminal device does not perform cell handover.

Optionally, if the first network device determines that a link connection between the first terminal device and the second terminal device is maintained according to the measurement result of the link, the first terminal device and the second terminal device are located in a cell covered by a same network device after the first terminal device performs the first handover scheme.

Specifically, if the first network device determines that the link connection between the first terminal device and the second terminal device is maintained, for example, when the first network device determines that the link connection between the first terminal device and the second terminal device should be maintained, or the link connection needs to be maintained continuously, the first handover scheme determined by the first network device will enable the first terminal device and the second terminal device after performing the second handover scheme to be located in a cell covered by an identical network device after the first terminal device performs the first handover scheme.

Optionally, if the first network device determines that the link connection between the first terminal device and the second terminal device is not maintained, the method further includes: the first terminal device receives release indication information and releases the link connection with the second terminal device according to the release indication information.

Optionally, the method further includes: the first terminal device acquires association information between the first terminal device and the second terminal device, wherein the association information includes a pairing relationship or a connection relationship between the first terminal device and the second terminal device; the first terminal device sends the association information to the first network device so that the first network device determines a first handover scheme according to the association information and the measurement results.

Specifically, the first terminal device may send the pairing relationship or connection relationship between the first terminal device and the second terminal device to the first network device, and the first network device determines the first handover scheme according to the pairing relationship or connection relationship between the first terminal device and the second terminal device and the measurement results of the links. For example, if the first terminal device and the second terminal device are in a connection relationship and have data interaction, the first network device will try to hand over the first terminal device to a cell with the same coverage network as the second terminal device according to the measurement results when determining the first handover scheme, although a signal intensity after handover is not optimal.

Optionally, if the first handover scheme includes that the first terminal device is handed over from a cell covered by the first network device to a cell covered by the second network device, the handover command received by the first terminal device in the act 530 further includes a resource for cell handover of the first terminal device.

The handover command may be issued by the second network device to the first terminal device through the first network device, and the first terminal device performs cell handover according to the resource configured by the second network device for cell handover of the first terminal device.

In the implementation of the present disclosure, the Relay UE and the Remote UE report their own link information to a network device, so that the network device may decide handover schemes of the two terminal devices according to the link information of the Relay UE and the link information of the Remote UE, to try to make the two terminal devices be located in a cell covered by an identical network device after cell handover or cell reselection, thus effective relay transmission may be continued between the Relay UE and the Remote UE after the Relay UE and the Remote UE perform cell handover.

FIG. 6 is a schematic flow chart of a handover method 600 according to an implementation of the present disclosure. The method may be performed by a second terminal device, which may be a Relay UE such as the terminal device 30 in FIG. 3 or a Remote UE such as the terminal device 40 in FIG. 3. As shown in FIG. 6, the handover method includes acts 610-630.

In 610, a second terminal device acquires a measurement result of a link, wherein the link includes a link between the second terminal device and a first network device.

In 620, the second terminal device sends the measurement result to the first network device through a first terminal device, and the measurement result is used for the first network device to determine a second handover scheme of the second terminal device.

In 630, the second terminal device receives a handover command and performs the second handover scheme according to the handover command.

Optionally, the second terminal device is in an inactive state or an idle state.

Optionally, the first terminal device is a Relay UE and the second terminal device is a Remote UE, or the first terminal device is a Remote UE and the second terminal device is a Relay UE.

Specifically, when the second terminal device performs cell handover, the second terminal device acquires a measurement result of a link between the second terminal device and the first network device, and reports the measurement result to the first network device through the first terminal device, so that the first network device determines a second handover scheme for the second terminal device or may further determine a first handover scheme for the first terminal device according to the measurement result of the link between the first network device and the second terminal device and a measurement result of a link between the first network device and the first terminal device received from the first terminal device. Since the first network device simultaneously acquires the measurement result of the link between the second terminal device and the first network device and the measurement result of the link between the first terminal device and the first network device, when the first network device determines the handover scheme for the second terminal device, it may comprehensively consider measurement results of multiple links and try to select a cell covered by the same network device as the first terminal device for the second terminal device as its reselected cell to be accessed.

Optionally, the measurement result of the link acquired by the second terminal device may further include a measurement result of a link between the second terminal device and the first terminal device.

Optionally, the measurement result of the link includes a measurement result of a link quality of the link and/or a measurement result of a link state of the link.

Optionally, in 620, the second handover scheme determined by the first network device for the second terminal device includes that the second terminal device reselects a cell covered by the second network device as a cell to be accessed, or the second terminal device does not perform cell reselection.

Optionally, the second terminal device sends the measurement result to the first network device through the first terminal device, including: the second terminal device sends the measurement result carried in an adaptation layer or a direct connection interface protocol stack PC5 to the first network device through the first terminal device.

That is, information of interaction such as measurement results among the first terminal device, the second terminal device, and the first network device may be carried in an adaptation layer or in a signaling or data of an existing direct connection interface protocol stack PC5.

Optionally, if the first network device determines that a link connection between the first terminal device and the second terminal device is maintained, after the second terminal device performs the second handover scheme, the second terminal device and the first terminal device are located in a cell covered by a same network device.

Specifically, if the first network device determines that the link connection between the first terminal device and the second terminal device is maintained, for example, when the first network device determines that the link connection between the first terminal device and the second terminal device should be maintained, or the link connection needs to be maintained continuously, the second handover scheme determined by the first network device will enable the second terminal device and the first terminal device after performing the first handover scheme to be located in a cell covered by a same network device after the second terminal device performs the second handover scheme.

Optionally, if the first network device determines that the link connection between the second terminal device and the first terminal device does not need to be maintained, the method further includes: the second terminal device receives release indication information and releases the link connection with the first terminal device according to the release indication information.

Optionally, if the second handover scheme includes that the second terminal device reselects a cell covered by the second network device as a cell to be accessed, the handover command further includes information of a cell to be accessed reselected by the second terminal device.

The handover command may be issued by the second network device to the second terminal device through the first network device or the first terminal device. The second terminal device performs cell reselection according to the received information of the cell and reselects a cell covered by the second network device as a cell to be accessed.

Optionally, in 630, the second terminal device receives the handover command, including: the second terminal device receives the handover command sent by the first terminal device; or the second terminal device receives the handover command sent by the first network device through a paging message.

In the implementation of the present disclosure, a terminal device in an idle state or inactive state reports its own link information to a network device through a terminal device in a connected state, so that the network device may decide handover schemes of the two terminal devices according to link information of the two terminal device, to try to make the two terminal devices be located in a cell covered by a same network device after cell handover or cell reselection, thus effective relay transmission may be continued between the Relay UE and the Remote UE after the Relay UE and the Remote UE perform cell handover.

FIG. 7 is a schematic flow chart of a handover method 700 according to an implementation of the present disclosure. The method may be performed by a second network device, such as the network device 20 in FIG. 3. As shown in FIG. 7, the handover method includes acts 710-720.

In 710, a second network device receives a handover request message sent by a first network device, and the handover request message is used for indicating that a first terminal device requests performing a first handover scheme and a second terminal device requests performing a second handover scheme.

In 720, the second network device sends a handover command to the first network device according to the handover request message.

Optionally, the first terminal device is a Relay UE and the second terminal device is a Remote UE, or the first terminal device is a Remote UE and the second terminal device is a Relay UE.

Specifically, when the first terminal device and the second terminal device perform cell handover, the first network device determines a first handover scheme for the first terminal device and a second handover scheme for the second terminal device according to measurement results of links. Since the first network device simultaneously acquires a measurement result of a link between the first terminal device and the first network device and a measurement result of a link between the second terminal device and the first network device (or may further simultaneously acquire a measurement result of a link between the first terminal device and the second terminal device), when determining respective handover schemes for the first terminal device and the second terminal device, the first network device may comprehensively consider measurement results of multiple links and try to select a cell covered by an identical network device as a cell to be handed over to or a reselected cell to be accessed for the first terminal device and the second terminal device. When the first network device selects a cell covered by the second network device as a cell to be handed over to or a reselected cell to be accessed for both the first terminal device and the second terminal device, the handover command (HO CMD) sent by the first network device and received by the second network device simultaneously indicates that the first terminal device requests performing the first handover scheme and the second terminal device requests performing the second handover scheme.

Optionally, if the first terminal device is in a connected state, the first handover scheme includes that the first terminal device is handed over from a cell covered by the first network device to a cell covered by the second network device, or the first terminal device does not perform cell handover.

If the first terminal device is in an inactive state or an idle state, the first handover scheme includes that the first terminal device reselects a cell covered by the second network device as a cell to be accessed, or the first terminal device does not perform cell reselection;

If the second terminal device is in a connected state, the second handover scheme includes that the second terminal device is handed over from a cell covered by the first network device to a cell covered by the second network device or a cell covered by another network device, or the second terminal device does not perform cell handover;

If the second terminal device is in an inactive state or an idle state, the second handover scheme includes that the second terminal device reselects a cell covered by the second network device or a cell covered by another network device as a cell to be accessed, or the second terminal device does not perform cell reselection.

Optionally, if the first handover scheme includes that the first terminal device is handed over from a cell covered by the first network device to a cell covered by the second network device, the handover command includes a resource for cell handover of the first terminal device.

Optionally, if the second handover scheme includes that the second terminal device is handed over from a cell covered by the first network device to a cell covered by the second network device, the handover command further includes a resource for cell handover of the second terminal device.

Optionally, if the second handover scheme includes that the second terminal device reselects a cell covered by the second network device as a cell to be accessed, the handover command further includes information on whether the second terminal device is allowed to perform cell reselection.

In 720, the second network device may send a handover command to the first network device, thereby indicating a resource for cell handover or cell information of a cell to be reselected to the first terminal device and the second terminal device through the first network device.

In the implementation of the present disclosure, after receiving a handover request message, a network device determines whether respective handover schemes of the Relay UE and the Remote UE are appropriate, and simultaneously issues a handover command to the Relay UE and the Remote UE, to try to make the two terminal devices be located in a cell covered by the network device itself after the two terminal devices perform cell handover or cell reselection, thus effective relay transmission may be continued between the Relay UE and the Remote UE after the Relay UE and the Remote UE perform cell handover.

Figure 8:
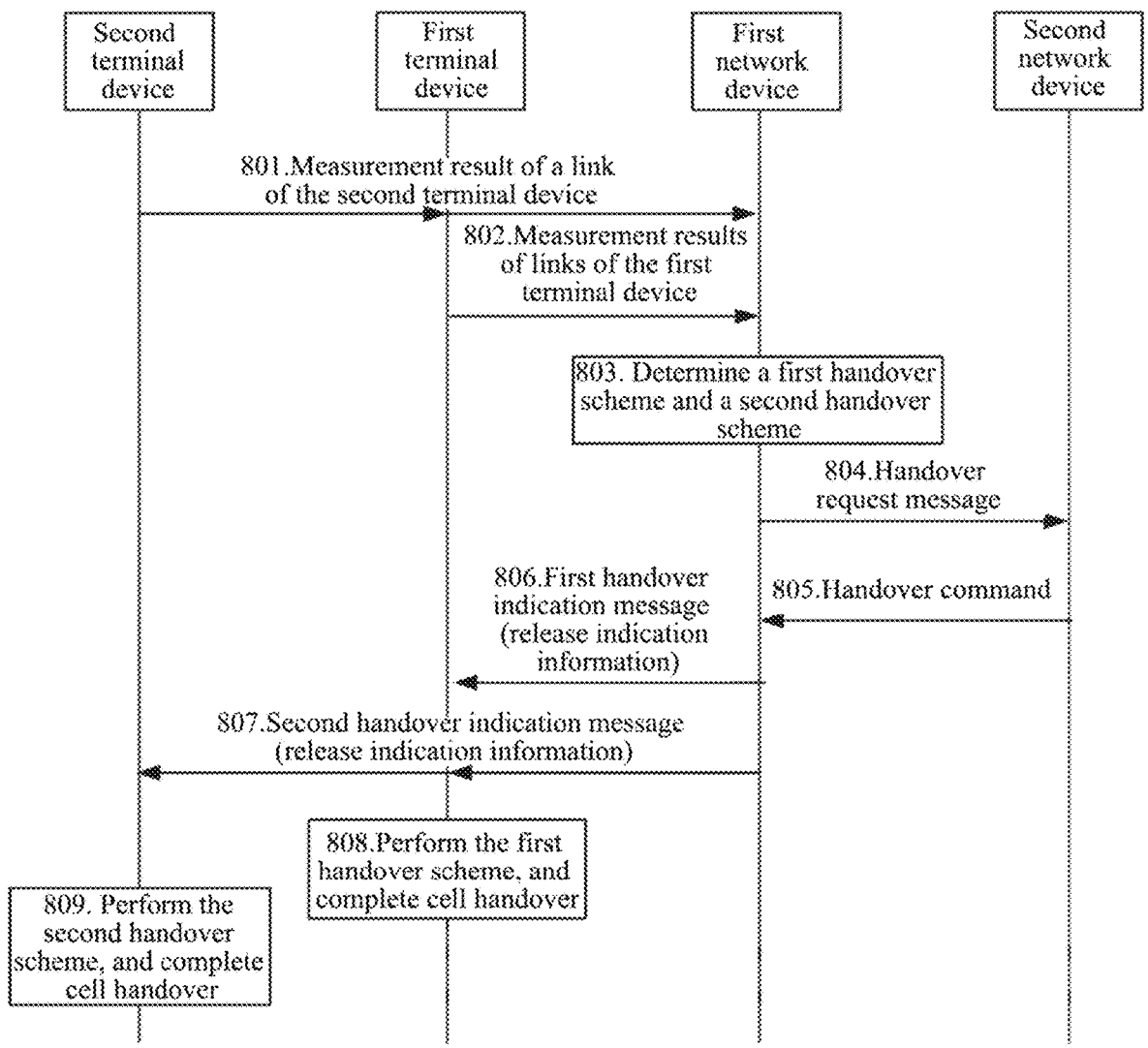
FIG. 8 is a diagram of an interaction flow of a handover method according to an implementation of the present disclosure.
Figure 9:
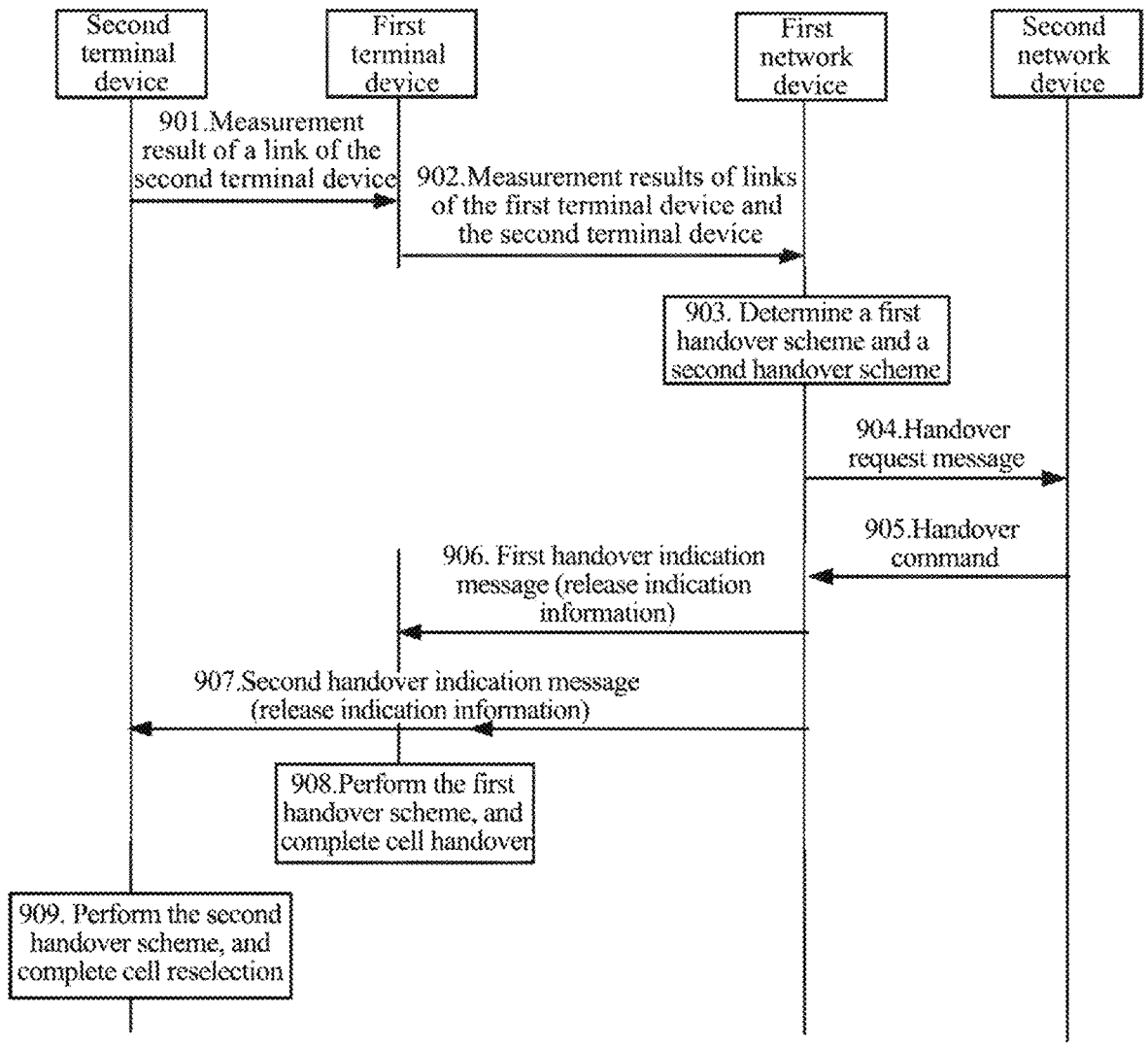
FIG. 9 is a diagram of an interaction flow of a handover method according to an implementation of the present disclosure.

Referring to FIGS. 8 and 9, the handover method of the implementation of the present disclosure will be described in detail with two detailed examples. It should be understood that FIGS. 8 and 9 are only examples, and the implementations of the present disclosure are not limited thereto.

FIG. 8 is a diagram of an interaction flow of a handover method according to an implementation of the present disclosure. Both the first terminal device and the second terminal device in FIG. 8 are in a connected state. As shown in FIG. 8, the method includes acts 801-809.

In 801, a second terminal device sends a measurement result of a link of the second terminal device to a first network device.

The measurement result of the link of the second terminal device includes a measurement result (e.g., link condition or link quality) of a link between the second terminal device and the first network device.

Optionally, the second terminal device may send the measurement result of the link of the second terminal device to the first network device through a first terminal device.

In 802, a first terminal device sends measurement results of links of the first terminal device to the first network device.

The measurement results of the links of the first terminal device include a measurement result of a link between the first terminal device and the first network device and a measurement result of a link between the first terminal device and the second terminal device.

At this time, the first terminal device may further send a pairing relationship/connection relationship between the first terminal device and the second terminal device to the first network device.

In 803, the first network device determines a first handover scheme of the first terminal device and a second handover scheme of the second terminal device.

The first network device may determine the first handover scheme of the first terminal device and the second handover scheme of the second terminal device according to measurement results of links and a pairing relationship/connection relationship between the first terminal device and the second terminal device.

The first handover scheme includes that the first terminal device is handed over from a cell covered by the first network device to a cell covered by the second network device, and the second handover scheme includes that the second terminal device is handed over from a cell covered by the first network device to a cell covered by the second network device.

In 804, the first network device sends a handover request message to the second network device.

The handover request message includes a context of the first terminal device and a context of the second terminal device, and/or includes a pairing relationship/connection relationship between the first terminal device and the second terminal device.

In 805, the second network device sends a handover command to the first network device.

The handover command includes a resource for cell handover of the first terminal device and a resource for cell handover of the second terminal device.

In 806, the first network device sends a first handover indication message to the first terminal device.

The first handover indication message includes a resource for cell handover of the first terminal device, and the first handover indication message is used for instructing the first terminal device to perform the first handover scheme.

In 807, the first network device sends a second handover indication message to the second terminal device.

The second handover indication message includes a resource for cell handover of the second terminal device, and the second handover indication message is used for instructing the second terminal device to perform the second handover scheme.

Optionally, the first network device may send second handover indication message to the second terminal device through the first terminal device.

In 808, the first terminal device performs the first handover scheme to be handed over to a cell covered by the second network device.

In 809, the second terminal device performs the second handover scheme to be handed over to a cell covered by the second network device.

If the first network device determines that a link connection between the first terminal device and the second terminal device does not need to be or should not be or is not suitable for continuing to be maintained, or a current condition of a signal intensity cannot better maintain the link connection between the first terminal device and the second terminal device, the first network device may further send release indication information to the first terminal device and the second terminal device to indicate releasing of the link connection between each other.

The release indication information may be sent to the first terminal device together through the first handover indication message and to the second terminal device together through the second handover indication message.

FIG. 9 is a diagram of an interaction flow of a handover method according to an implementation of the present disclosure. In FIG. 9, the first terminal device is in a connected state, and the second terminal device is in an inactive state or an idle state. As shown in FIG. 9, the method includes acts 901-909.

In 901, a second terminal device sends a measurement result of a link of the second terminal device to a first network device through a first terminal device.

The measurement result of the link of the second terminal device includes a measurement result (e.g., link condition or link quality) of a link between the second terminal device and the first network device.

In 902, the first terminal device sends measurement results of links of the first terminal device and a measurement result of a link of the second terminal device to the first network device.

The measurement results of the links of the first terminal device includes a measurement result of a link between the first terminal device and the first network device and a measurement result of a link between the first terminal device and the second terminal device.

At this time, the first terminal device may further send a pairing relationship/connection relationship between the first terminal device and the second terminal device to the first network device.

In 903, the first network device determines a first handover scheme of the first terminal device and a second handover scheme of the second terminal device.

The first network device may determine the first handover scheme of the first terminal device and the second handover scheme of the second terminal device according to measurement results of links and a pairing relationship/connection relationship between the first terminal device and the second terminal device.

The first handover scheme includes that the first terminal device is handed over from a cell covered by the first network device to a cell covered by the second network device, and the second handover scheme includes that the second terminal device reselects a cell covered by the second network device as a cell to be accessed.

In 904, the first network device sends a handover request message to the second network device.

The handover request message includes a context of the first terminal device and a context of the second terminal device, and/or includes a pairing relationship/connection relationship between the first terminal device and the second terminal device.

In 905, the second network device sends a handover command to the first network device.

The handover command includes a resource for cell handover of the first terminal device and information on whether the second terminal device is allowed to perform cell reselection.

Assuming that the second network device allows the second terminal device to reselect a cell, i.e., allows the second terminal device to determine a cell covered by the second network device as a cell to be accessed, the handover command further includes cell information of the cell to be reselected by the second terminal device.

In 906, the first network device sends a first handover indication message to the first terminal device.

The first handover indication message includes a resource for cell handover of the first terminal device, and the first handover indication message is used for instructing the first terminal device to perform the first handover scheme.

In 907, the first network device sends a handover indication message to the second terminal device through the first terminal device.

The second handover indication message includes cell information of a cell to be reselected by the second terminal device, and the second handover indication message is used for instructing the second terminal device to perform the second handover scheme.

In 908, the first terminal device performs the first handover scheme to be handed over to a cell covered by the second network device.

In 909, the second terminal device performs the second handover scheme to reselect a cell covered by the second network device as a cell to be accessed.

If the first network device determines that a link connection between the first terminal device and the second terminal device does not need to be or should not be or is not suitable for continuing to be maintained, or a current condition of a signal intensity cannot better maintain the link connection between the first terminal device and the second terminal device, the first network device may further send release indication information to the first terminal device and the second terminal device to indicate releasing of the link connection between each other.

The release indication information may be sent to the first terminal device together through the first handover indication message and to the second terminal device together through the second handover indication message.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Figure 10:
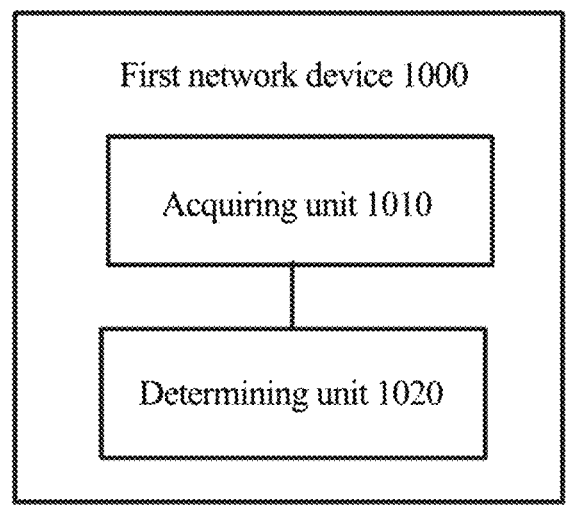
FIG. 10 is a schematic block diagram of a network device according to an implementation of the present disclosure.

FIG. 10 is a schematic block diagram of a network device 1000 according to an implementation of the present disclosure. As shown in FIG. 10, the network device 1000 is a first network device and includes an acquiring unit 1010 and a determining unit 1020.

The acquiring unit is used for acquiring measurement results of links, wherein the links include a link between the first network device and a first terminal device and a link between the first network device and a second terminal device.

The determining unit is used for determining a first handover scheme of the first terminal device and/or a second handover scheme of the second terminal device according to the measurement results acquired by the acquiring unit.

Therefore, the network device determines handover schemes of the two terminal devices by acquiring link information of the Relay UE and link information of the Remote UE, to try to make the two terminal devices be located in a cell covered by a same network device after cell handover or cell reselection, thus effective relay transmission may be continued between the Relay UE and the Remote UE after the Relay UE and the Remote UE perform cell handover.

Optionally, the links further include a link between the first terminal device and the second terminal device.

Optionally, the determining unit is specifically used for determining the first handover scheme and/or the second handover scheme according to states of the first terminal device and the second terminal device, and the measurement results.

Optionally, if the first terminal device is in a connected state, the first handover scheme includes that the first terminal device is handed over from a cell covered by the first network device to a cell covered by the second network device, or the first terminal device does not perform cell handover.

If the first terminal device is in an inactive state or an idle state, the first handover scheme includes that the first terminal device reselects a cell covered by the second network device as a cell to be accessed, or the first terminal device does not perform cell reselection.

If the second terminal device is in a connected state, the second handover scheme includes that the second terminal device is handed over from a cell covered by the first network device to a cell covered by the second network device or a cell covered by another network device, or the second terminal device does not perform cell handover.

If the second terminal device is in an inactive state or an idle state, the second handover scheme includes that the second terminal device reselects a cell covered by the second network device or a cell covered by another network device as a cell to be accessed, or the second terminal device does not perform cell reselection.

Optionally, the determining unit is specifically used for determining whether a link connection between the first terminal device and the second terminal device is maintained according to the measurement results; determining the first handover scheme and/or the second handover scheme according to whether the link connection between the first terminal device and the second terminal device is maintained.

Optionally, if the first network device determines that the link connection between the first terminal device and the second terminal device is maintained, after the first terminal device performs the first handover scheme and the second terminal device performs the second handover scheme, the first terminal device and the second terminal device are located in a cell covered by a same network device.

Optionally, the first network device further includes a sending unit, and the determining unit is further used for determining whether a link connection between the first terminal device and the second terminal device is maintained according to the measurement results.

If the first network device determines that the link connection between the first terminal device and the second terminal device is not maintained, the sending unit is used for sending release indication information to the first terminal device, and the release indication information is used for instructing the first terminal device to release the link connection with the second terminal device.

Optionally, the acquiring unit is further used for acquiring association information between the first terminal device and the second terminal device before the determining unit determines the first handover scheme of the first terminal device and/or the second handover scheme of the second terminal device according to the measurement results, wherein the association information includes a pairing relationship or a connection relationship between the first terminal device and the second terminal device.

The determining unit is specifically used for determining the first handover scheme and/or the second handover scheme according to the association information and the measurement results.

Optionally, if the first handover scheme includes that the first terminal device is handed over from a cell covered by the first network device to a cell covered by the second network device, the first network device further includes a receiving unit, and the sending unit is further used for sending a handover request message to the second network device, wherein the handover request message is used for indicating that the first terminal device requests performing the first handover scheme.

The receiving unit is used for receiving a handover command sent by the second network device according to the handover request message, wherein the handover command includes a resource for cell handover of the first terminal device.

Optionally, the handover request message includes association information between the first terminal device and the second terminal device.

Optionally, if the second handover scheme includes that the second terminal device is handed over from a cell covered by the first network device to a cell covered by the second network device, the handover request message is further used for indicating that the second terminal device requests performing the second handover scheme, and the handover command further includes a resource for cell handover of the second terminal device.

Optionally, if the second handover scheme includes that the second terminal device reselects a cell covered by the second network device or a cell covered by another network device as a cell to be accessed, the handover request message is further used for indicating that the second terminal device requests performing the second handover scheme, and the handover command further includes information on whether the second terminal device is allowed to perform cell reselection.

Optionally, if the second network device allows the second terminal device to perform cell reselection, the handover command further includes information of a cell to be accessed reselected by the second terminal device.

Optionally, the first terminal device is a Relay UE and the second terminal device is a Remote UE; or the first terminal device is a Remote UE and the second terminal device is a Relay UE.

Optionally, the measurement result of a link includes a measurement result of a link quality of the link and/or a measurement result of a link state of the link.

Optionally, the acquiring unit is specifically used for receiving the measurement results sent by the first terminal device; or receiving a measurement result of a link between the first terminal device and the first network device sent by the first terminal device, and receiving a measurement result of a link between the second terminal device and the first network device sent by the second terminal device.

Optionally, the acquiring unit is specifically used for receiving a measurement result of a link between the first terminal device and the second terminal device sent by the first terminal device or the second terminal device.

Optionally, the acquiring unit is specifically used for acquiring a measurement result of a link carried in an adaptation layer or a direct connection interface protocol stack PC5 sent by the first terminal device or the second terminal device.

Figure 11:
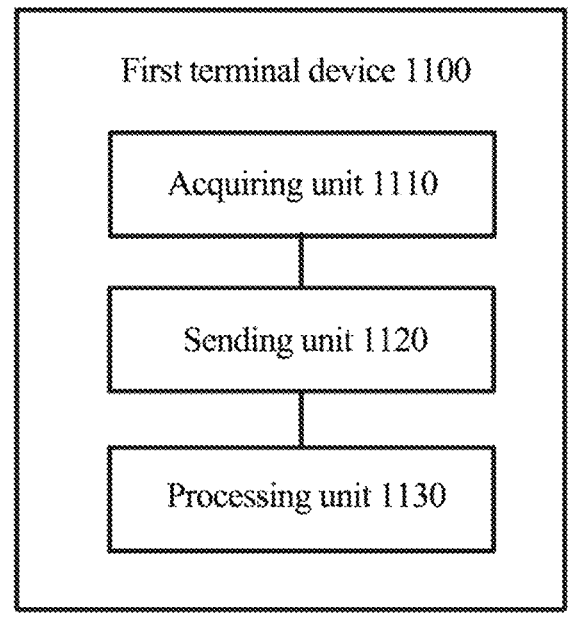
FIG. 11 is a schematic block diagram of a terminal device according to an implementation of the present disclosure.

FIG. 11 is a schematic block diagram of a terminal device 1100 according to an implementation of the present disclosure. As shown in FIG. 11, the terminal device 1100 is a second terminal device, and the terminal device 1100 includes an acquiring unit 1110, a sending unit 1120, and a processing unit 1130.

The acquiring unit 1110 is used for acquiring measurement results of links, wherein the links includes a link between a first terminal device and a first network device, and a link between the first network device and a second terminal device.

The sending unit 1120 is used for sending the measurement results acquired by the acquiring unit 1110 to the first network device, wherein the measurement results are used for the first network device to determine a first handover scheme of the first terminal device.

The processing unit 1130 is used for receiving a handover command and performing the first handover scheme according to the handover command.

Therefore, the Relay UE and the Remote UE report their own link information to a network device, so that the network device may decide handover schemes of the two terminal devices according to link information of the Relay UE and the link information of the Remote UE, to try to make the two terminal devices be located in a cell covered by a same network device after cell handover or cell reselection, thus effective relay transmission may be continued between the Relay UE and the Remote UE after the Relay UE and the Remote UE perform cell handover.

Optionally, the links further include a link between the first terminal device and the second terminal device.

Optionally, the first handover scheme includes that the first terminal device is handed over from a cell covered by the first network device to a cell covered by the second network device, or the first terminal device does not perform cell handover.

Optionally, if the first network device determines that a link connection between the first terminal device and the second terminal device is maintained, the first terminal device and the second terminal device are located in a cell covered by a same network device after the first terminal device performs the first handover scheme.

Optionally, if the first network device determines that the link connection between the first terminal device and the second terminal device is not maintained, the processing unit 1130 is further used for receiving release indication information and release the link connection with the second terminal device according to the release indication information.

Optionally, the acquiring unit 1110 is further used for acquiring association information between the first terminal device and the second terminal device, wherein the association information includes a pairing relationship or a connection relationship between the terminal device and the second terminal device.

The sending unit 1120 is further used for sending the association information to the first network device so that the first network device determines the first handover scheme according to the association information and the measurement results.

Optionally, if the first handover scheme includes that the first terminal device is handed over from a cell covered by the first network device to a cell covered by the second network device, the handover command further includes a resource for cell handover of the first terminal device.

Optionally, the first terminal device is a Relay UE and the second terminal device is a Remote UE; or the first terminal device is a Remote UE and the second terminal device is a Relay UE.

Optionally, the measurement result of a link includes a measurement result of a link quality of the link and/or a measurement result of a link state of the link.

Optionally, the acquiring unit 1110 is specifically used for determining a measurement result of a link between the first terminal device and the first network device, and receiving a measurement result of a link between the first network device and the second terminal device sent by the second terminal device.

Optionally, the acquiring unit 1110 is specifically used for determining a measurement result of a link between the first terminal device and the second terminal device; or receiving a measurement result of a link between the first terminal device and the second terminal device sent by the second terminal device.

Optionally, the acquiring unit 1110 is specifically used for acquiring a measurement result of a link carried in an adaptation layer or a direct connection interface protocol stack PC5 sent by the second terminal device.

Figure 12:
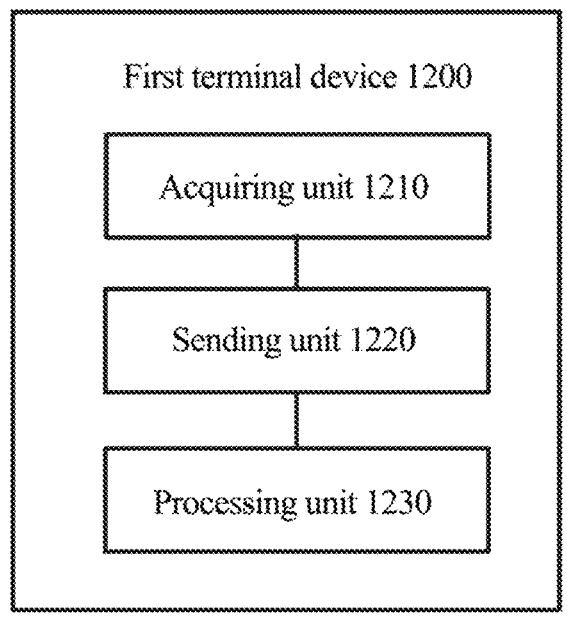
FIG. 12 is a schematic block diagram of a terminal device according to an implementation of the present disclosure.

FIG. 12 is a schematic block diagram of a terminal device 1200 according to an implementation of the present disclosure. As shown in FIG. 12, the terminal device 1200 is a second terminal device and includes an acquiring unit 1210, a sending unit 1220, and a processing unit 1230.

The acquiring unit 1210 is used for acquiring a measurement result of a link, wherein the link includes a link between the second terminal device and a first network device.

The sending unit 1220 is used for sending the measurement result acquired by the acquiring unit 1210 to the first network device through the first terminal device, the measurement result being used by the first network device to determine a second handover scheme of the second terminal device.

The processing unit 1230 is used for receiving a handover command and performing the second handover scheme according to the handover command.

Therefore, a terminal device in an idle state or inactive state reports its own link information to a network device through a terminal device in a connected state, so that the network device may decide handover schemes of the two terminal devices according to link information of the two terminal device, to try to make the two terminal devices be located in a cell covered by a same network device after cell handover or cell reselection, thus effective relay transmission may be continued between the Relay UE and the Remote UE after the Relay UE and the Remote UE perform cell handover.

Optionally, the link further includes a link between the first terminal device and the second terminal device.

Optionally, the second handover scheme includes that the second terminal device reselects a cell covered by the second network device as a cell to be accessed, or the second terminal device does not perform cell reselection.

Optionally, if the first network device determines that a link connection between the first terminal device and the second terminal device is maintained, after the second terminal device performs the second handover scheme, the second terminal device and the first terminal device are located in a cell covered by a same network device.

Optionally, if the first network device determines that a link connection between the second terminal device and the first terminal device does not need to be maintained, the processing unit 1230 is further used for receiving release indication information and releasing the link connection with the first terminal device according to the release indication information.

Optionally, if the second handover scheme includes that the second terminal device reselects a cell covered by the second network device as a cell to be accessed, the handover command further includes information of a cell to be accessed reselected by the second terminal device.

Optionally, the first terminal device is a Relay UE and the second terminal device is a Remote UE; or the first terminal device is a Remote UE and the second terminal device is a Relay UE.

Optionally, the measurement result of the link includes a measurement result of a link quality of the link and/or a measurement result of a link state of the link.

Optionally, the sending unit 1220 is specifically used for sending the measurement result carried in an adaptation layer or a direct connection interface protocol stack PC5 to the first network device through the first terminal device.

Optionally, the processing unit 1230 is specifically used for receiving the handover command sent by the first terminal device and performing the second handover scheme according to the handover command; or receiving the handover command sent by the first network device through a paging message and performing the second handover scheme according to the handover command.

Figure 13:
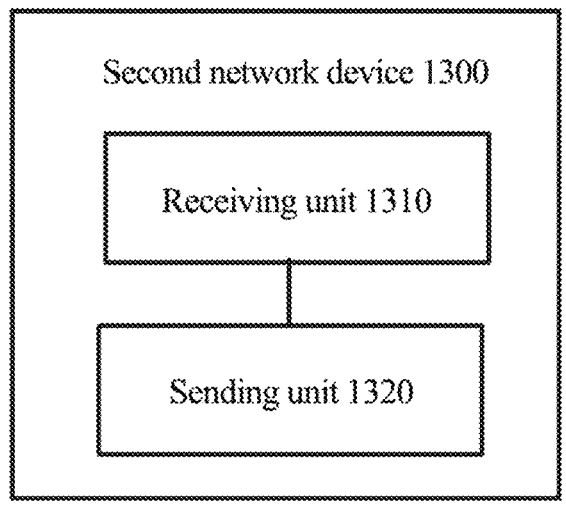
FIG. 13 is a schematic block diagram of a network device according to an implementation of the present disclosure.

FIG. 13 is a schematic block diagram of a network device 1300 according to an implementation of the present disclosure. As shown in FIG. 13, the network device 1300 is a second network device and includes a receiving unit 1310 and a sending unit 1320.

The receiving unit 1310, used for receiving a handover request message sent by a first network device, wherein the handover request message is used for indicating that a first terminal device requests performing a first handover scheme and the second terminal device requests performing a second handover scheme.

The sending unit 1320 is used for sending a handover command to the first network device according to the handover request message received by the receiving unit 1310.

Therefore, after receiving a handover request message, a network device determines whether respective handover schemes of the Relay UE and the Remote UE are appropriate, and simultaneously issues a handover command to the Relay UE and the Remote UE, to try to make the two terminal devices be located in a cell covered by the network device itself after the two terminal devices perform cell handover or cell reselection, thus effective relay transmission may be continued between the Relay UE and the Remote UE after the Relay UE and the Remote UE perform cell handover.

Optionally, if the first terminal device is in a connected state, the first handover scheme includes that the first terminal device is handed over from a cell covered by the first network device to a cell covered by the second network device, or the first terminal device does not perform cell handover.

If the first terminal device is in an inactive state or an idle state, the first handover scheme includes that the first terminal device reselects a cell covered by the second network device as a cell to be accessed, or the first terminal device does not perform cell reselection.

If the second terminal device is in a connected state, the second handover scheme includes that the second terminal device is handed over from a cell covered by the first network device to a cell covered by the second network device or a cell covered by another network device, or the second terminal device does not perform cell handover.

If the second terminal device is in an inactive state or an idle state, the second handover scheme includes that the second terminal device reselects a cell covered by the second network device or a cell covered by another network device as a cell to be accessed, or the second terminal device does not perform cell reselection.

Optionally, if the first handover scheme includes that the first terminal device is handed over from a cell covered by the first network device to a cell covered by the second network device, the handover command further includes a resource for cell handover of the first terminal device.

Optionally, if the second handover scheme includes that the second terminal device is handed over from a cell covered by the first network device to a cell covered by the second network device, the handover command further includes a resource for cell handover of the second terminal device.

Optionally, if the second handover scheme includes that the second terminal device reselects a cell covered by the second network device as a cell to be accessed, the handover command further includes information on whether the second terminal device is allowed to perform cell reselection.

Optionally, if the second network device allows the second terminal device to perform cell reselection, the handover command further includes information of a cell to be accessed reselected by the second terminal device.

Optionally, the first terminal device is a Relay UE and the second terminal device is a Remote UE; or the first terminal device is a Remote UE and the second terminal device is a Relay UE.

Figure 14:
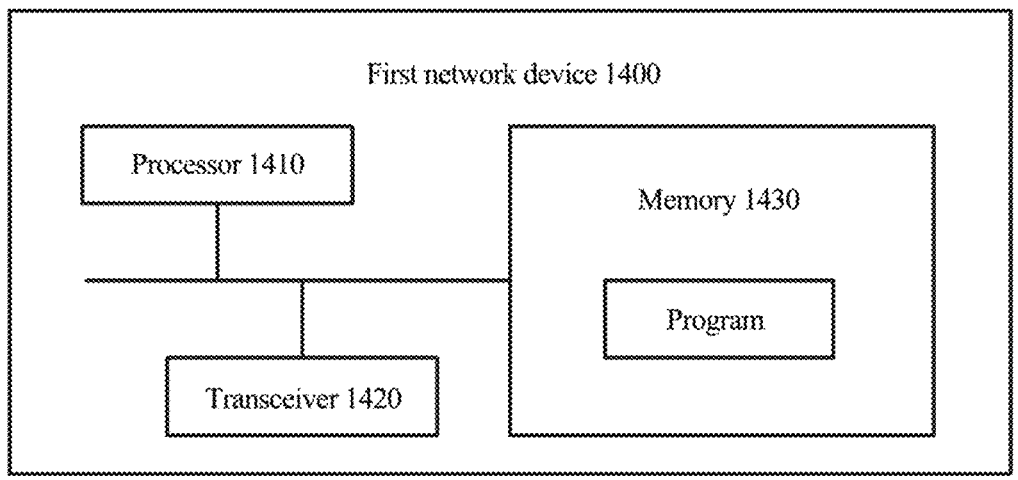
FIG. 14 is a schematic diagram of structure of a network device according to an implementation of the present disclosure.

FIG. 14 is a schematic diagram of structure of a network device 1400 according to an implementation of the present disclosure. As shown in FIG. 14, the network device includes a processor 1410, a transceiver 1420, and a memory 1430, wherein the processor 1410, the transceiver 1420, and the memory 1430 communicate with each other through an internal connection path. The memory 1430 is used for storing instructions, and the processor 1410 is used for executing instructions stored in the memory 1430 to control the transceiver 1420 to send or receive signals.

Optionally, the processor 1410 may call the program codes stored in the memory 1430 to perform corresponding operations of network device in the method 400 shown in FIG. 4, which will not be described here repeatedly for brevity.

It should be understood that in the implementation of the present disclosure, the processor 1410 may be a Central Processing Unit (CPU), or the processor 1410 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 1430 may include a read only memory and a random access memory and provide instructions and data to the processor 1410. A portion of memory 1430 may further include a non-volatile random access memory. For example, the memory 1430 may further store device type information.

In an implementation process, the acts of the methods described above may be accomplished by integrated logic circuits of hardware in the processor 1410 or instructions in a form of software. The acts of the positioning method disclosed in the implementation of the present disclosure may be directly accomplished by an execution of a hardware processor or accomplished by a combination of hardware and software modules in the processor 1410. The software modules may be located in typical storage medium in the art, such as a random access memory, flash memory, read-only memory, programmable read-only memory or electrically erasable programmable memory, or register. The storage medium is located in the memory 1430, and the processor 1410 reads the information in the memory 1430 and accomplishes the acts of the above method in combination with its hardware. In order to avoid repetition, it will not be described in detail here.

The network device 1400 according to the implementation of the present disclosure may correspond to the network device for executing the method 400 in the method 400 and the network device 1000 according to the implementation of the present disclosure, and various units or modules in the network device 1400 are respectively used for executing various actions or processing processes executed by the network device in the method 400. Here, in order to avoid redundancy, detailed description thereof is omitted.

Figure 15:
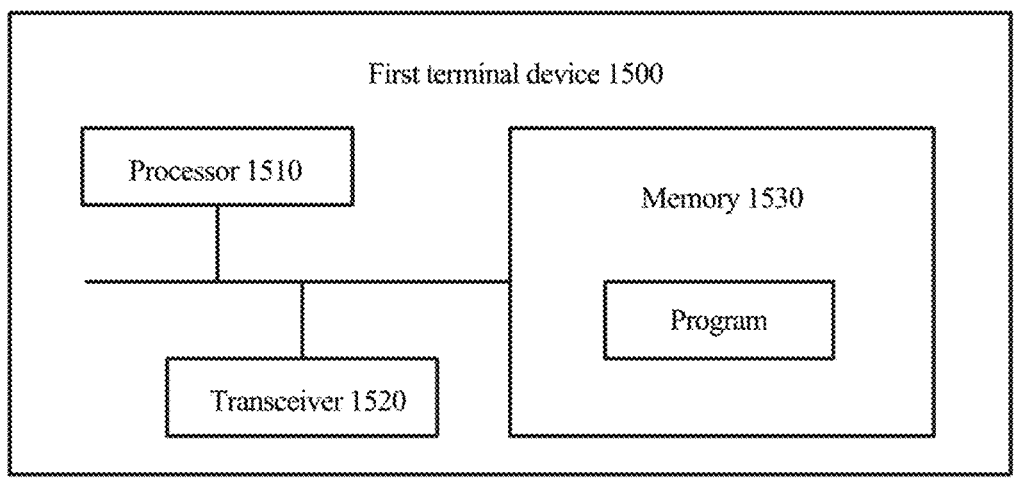
FIG. 15 is a schematic diagram of structure of a terminal device according to an implementation of the present disclosure.

FIG. 15 is a schematic diagram of structure of a terminal device 1500 according to an implementation of the present disclosure. As shown in FIG. 15, the terminal device includes a processor 1510, a transceiver 1520, and a memory 1530, wherein the processor 1510, the transceiver 1520, and the memory 1530 communicate with each other through an internal connection path. The memory 1530 is used for storing instructions, and the processor 1510 is used for executing instructions stored in the memory 1530 to control the transceiver 1520 to send or receive signals.

Optionally, the processor 1510 may call the program codes stored in the memory 1530 to perform corresponding operations of terminal device in the method 500 shown in FIG. 5, which will not be described here repeatedly for brevity.

It should be understood that, in an implementation of the present disclosure, the processor 1510 may be a central processing unit (CPU), or the processor 1510 may be other general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 1530 may include a read only memory and a random access memory and provide instructions and data to the processor 1510. A portion of memory 1530 may further include a non-volatile random access memory. For example, the memory 1530 may further store device type information.

In an implementation process, the acts of the methods described above may be accomplished by integrated logic circuits of hardware in the processor 1510 or instructions in a form of software. The acts of the positioning method disclosed in the implementation of the present disclosure may be directly accomplished by an execution of a hardware processor or accomplished by a combination of hardware and software modules in the processor 1510. The software modules may be located in typical storage medium in the art, such as a random access memory, flash memory, read-only memory, programmable read-only memory or electrically erasable programmable memory, or register. The storage medium is located in the memory 1530, and the processor 1510 reads the information in the memory 1530 and accomplishes the acts of the above method in combination with its hardware. In order to avoid repetition, it will not be described in detail here.

The terminal device 1500 according to the implementation of the present disclosure may correspond to the terminal device for executing the method 500 in the method 500 and the terminal device 1100 according to the implementation of the present disclosure, and various units or modules in the terminal device 1500 are respectively used for executing various actions or processing processes executed by the terminal device in the method 500. Here, in order to avoid redundancy, detailed description thereof is omitted.

Figure 16:
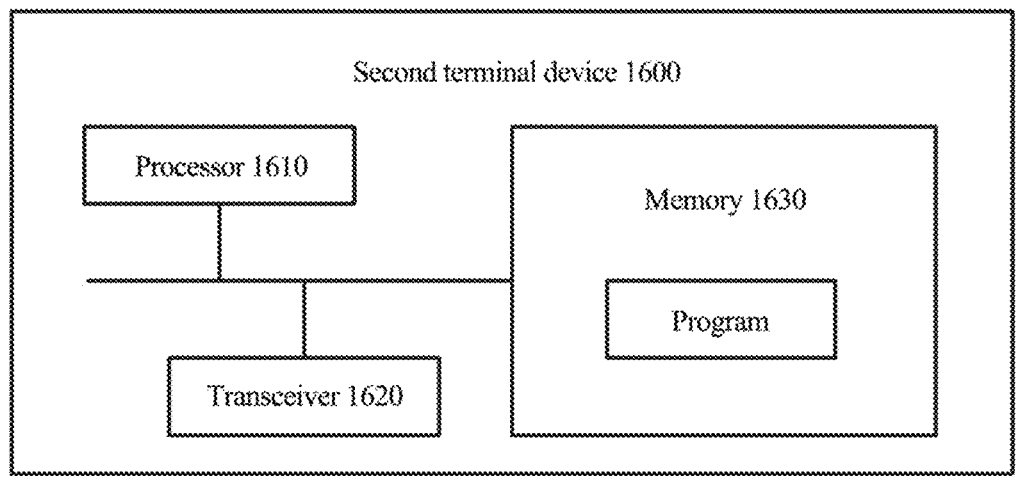
FIG. 16 is a schematic diagram of structure of a terminal device according to an implementation of the present disclosure.

FIG. 16 is a schematic diagram of structure of a terminal device 1600 according to an implementation of the present disclosure. As shown in FIG. 16, the terminal device includes a processor 1610, a transceiver 1620, and a memory 1630, wherein the processor 1610, the transceiver 1620, and the memory 1630 communicate with each other through an internal connection path. The memory 1630 is used for storing instructions, and the processor 1610 is used for executing instructions stored in the memory 1630 to control the transceiver 1620 to send or receive signals.

Optionally, the processor 1610 may call the program codes stored in the memory 1630 to perform corresponding operations of terminal device in the method 600 shown in FIG. 6, which will not be described here repeatedly for brevity.

It should be understood that, in an implementation of the present disclosure, the processor 1610 may be a central processing unit (CPU), or the processor 1610 may be other general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 1630 may include a read only memory and a random access memory and provide instructions and data to the processor 1610. A portion of memory 1630 may further include a non-volatile random access memory. For example, the memory 1630 may further store device type information.

In an implementation process, the acts of the methods described above may be accomplished by integrated logic circuits of hardware in the processor 1610 or instructions in a form of software. The acts of the positioning method disclosed in the implementation of the present disclosure may be directly accomplished by an execution of a hardware processor or accomplished by a combination of hardware and software modules in the processor 1610. The software modules may be located in typical storage medium in the art, such as a random access memory, flash memory, read-only memory, programmable read-only memory or electrically erasable programmable memory, or register. The storage medium is located in the memory 1630, and the processor 1610 reads the information in the memory 1630 and accomplishes the acts of the above method in combination with its hardware. In order to avoid repetition, it will not be described in detail here.

The terminal device 1600 according to the implementation of the present disclosure may correspond to the terminal device for executing the method 600 in the method 600 and the terminal device 1700 according to the implementation of the present disclosure, and various units or modules in the terminal device 1600 are respectively used for executing various actions or processing processes executed by the terminal device in the method 600. Here, in order to avoid redundancy, detailed description thereof is omitted.

Figure 17:
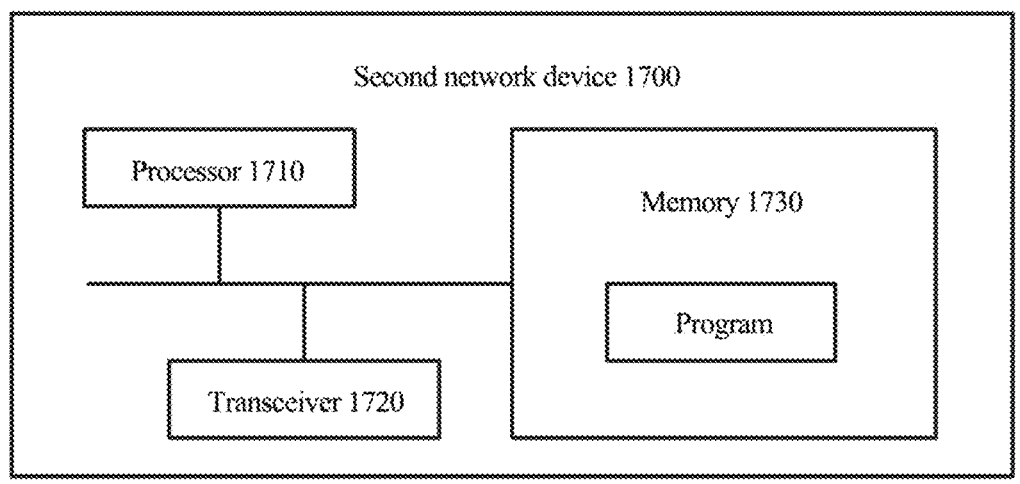
FIG. 17 is a schematic diagram of structure of a network device according to an implementation of the present disclosure.

FIG. 17 is a schematic diagram of structure of a network device 1700 according to an implementation of the present disclosure. As shown in FIG. 17, the network device includes a processor 1710, a transceiver 1720, and a memory 1730, wherein the processor 1710, the transceiver 1720, and the memory 1730 communicate with each other through an internal connection path. The memory 1730 is used for storing instructions, and the processor 1710 is used for executing instructions stored in the memory 1730 to control the transceiver 1720 to send or receive signals.

Optionally, the processor 1710 may call the program codes stored in the memory 1730 to perform corresponding operations of network device in the method 700 shown in FIG. 7, which will not be described here repeatedly for brevity.

It should be understood that in the implementation of the present disclosure, the processor 1710 may be a Central Processing Unit (CPU), or the processor 1710 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 1730 may include a read only memory and a random access memory and provide instructions and data to the processor 1710. A portion of memory 1730 may further include a non-volatile random access memory. For example, the memory 1730 may further store device type information.

In an implementation process, the acts of the methods described above may be accomplished by integrated logic circuits of hardware in the processor 1710 or instructions in a form of software. The acts of the positioning method disclosed in the implementation of the present disclosure may be directly accomplished by an execution of a hardware processor or accomplished by a combination of hardware and software modules in the processor 1710. The software modules may be located in typical storage medium in the art, such as a random access memory, flash memory, read-only memory, programmable read-only memory or electrically erasable programmable memory, or register. The storage medium is located in the memory 1730, and the processor 1710 reads the information in the memory 1730 and accomplishes the acts of the above method in combination with its hardware. In order to avoid repetition, it will not be described in detail here.

The network device 1700 according to the implementation of the present disclosure may correspond to the network device for executing the method 700 in the method 700 and the network device 1300 according to the implementation of the present disclosure, and various units or modules in the network device 1700 are respectively used for executing various actions or processing processes executed by the network device in the method 700. Here, in order to avoid redundancy, detailed description thereof is omitted.

Figure 18:
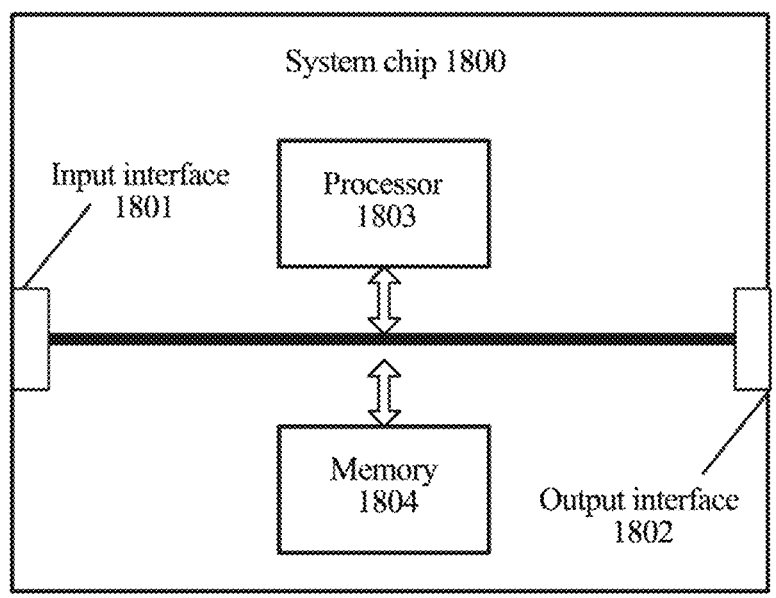
FIG. 18 is a schematic diagram of structure of a system chip according to an implementation of the present disclosure.

FIG. 18 is a schematic diagram of structure of a system chip according to an implementation of the present disclosure. The system chip 1800 of FIG. 18 includes an input interface 1801, an output interface 1802, at least one processor 1803, and a memory 1804. The input interface 1801, the output interface 1802, the processor 1803, and the memory 1804 are connected to each other through an internal connection path. The processor 1803 is used for executing codes in the memory 1804.

Optionally, the processor 1803 may implement the method 400 executed by the network device in the method implementation when the codes are executed. For the sake of brevity, it will not be repeated here.

Optionally, the processor 1803 may implement the method 500 executed by the terminal device in the method implementation when the codes are executed. For the sake of brevity, it will not be repeated here.

Optionally, the processor 1803 may implement the method 600 executed by the terminal device in the method implementation when the codes are executed. For the sake of brevity, it will not be repeated here.

Optionally, the processor 1803 may implement the method 700 executed by the network device in the method implementation when the codes are executed. For the sake of brevity, it will not be repeated here.

Those of ordinary skill in the art will recognize that the exemplary elements and algorithm acts described in connection with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage medium include a U disk, mobile hard disk, read-only memory (ROM), random access memory (RAM), magnetic disk or optical disk and other media that may store program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the implementations of the present disclosure should be based on the protection scope of the claims.

The invention claimed is:

1. A method for handover, comprising:
   receiving, by a first network device, measurement results of links from a first terminal device, wherein the measurement results of links comprise a measurement result of a link between the first network device and the first terminal device and a measurement result of a link between the first network device and a second terminal device, wherein the links further comprise a link between the first terminal device and the second terminal device, wherein the second terminal device is a remote device, and wherein the first network device is a relay device of the second terminal device; and
   determining, by the first network device, a first handover scheme of the first terminal device according to the measurement results.

2. The method according to claim 1, wherein determining, by the first network device, at least one of the first handover scheme of the first terminal device or the second handover scheme of the second terminal device according to the measurement results, comprises:
   determining, by the first network device, at least one of the first handover scheme or the second handover scheme according to states of the first terminal device and the second terminal device, and the measurement results.

3. The method according to claim 2, wherein when the first terminal device is in a connected state, the first handover scheme comprises that the first terminal device is handed over from a cell covered by the first network device to a cell covered by a second network device or the first terminal device does not perform cell handover;
   when the first terminal device is in an inactive state or an idle state, the first handover scheme comprises that the first terminal device reselects a cell covered by the second network device as a cell to be accessed or the first terminal device does not perform cell reselection;
   when the second terminal device is in a connected state, the second handover scheme comprises that the second terminal device is handed over from a cell covered by the first network device to a cell covered by the second network device or a cell covered by another network device or the second terminal device does not perform cell handover; and
   when the second terminal device is in an inactive state or an idle state, the second handover scheme comprises that the second terminal device reselects a cell covered by the second network device or a cell covered by another network device as a cell to be accessed or the second terminal device does not perform cell reselection.

4. The method according to claim 1, wherein determining, by the first network device, at least one of the first handover scheme of the first terminal device or the second handover scheme of the second terminal device according to the measurement results, comprises:
   determining, by the first network device, whether a link connection between the first terminal device and the second terminal device is maintained according to the measurement results; and
   determining, by the first network device, at least one of the first handover scheme or the second handover scheme according to whether the link connection between the first terminal device and the second terminal device is maintained.

5. The method according to claim 4, wherein if the first network device determines that the link connection between the first terminal device and the second terminal device is maintained,
   after the first terminal device performs the first handover scheme and the second terminal device performs the second handover scheme, the first terminal device and the second terminal device are located in a cell covered by a same network device.

6. The method according to claim 1, wherein the method further comprises:
   determining, by the first network device, whether a link connection between the first terminal device and the second terminal device is maintained according to the measurement results; and
   if the first network device determines that the link connection between the first terminal device and the second terminal device is not maintained, the method further comprises:
   sending, by the first network device, release indication information to the first terminal device, wherein the release indication information is used for instructing the first terminal device to release the link connection with the second terminal device.

7. The method according to claim 1, wherein before the first network device determines at least one of the first handover scheme of the first terminal device or the second handover scheme of the second terminal device according to the measurement results, the method further comprises:
   acquiring, by the first network device, association information between the first terminal device and the second terminal device, wherein the association information comprises a pairing relationship or a connection relationship between the first terminal device and the second terminal device; and
   determining, by the first network device, at least one of the first handover scheme of the first terminal device or the second handover scheme of the second terminal device according to the measurement results, comprises:
   determining, by the first network device, at least one of the first handover scheme or the second handover scheme according to the association information and the measurement results.

8. The method according to claim 1, wherein if the first handover scheme comprises that the first terminal device is handed over from a cell covered by the first network device to a cell covered by a second network device, the method further comprises:
   sending, by the first network device, a handover request message to the second network device, wherein the handover request message is used for indicating that the first terminal device requests performing the first handover scheme; and
   receiving, by the first network device, a handover command sent by the second network device according to the handover request message, wherein the handover command comprises a resource for cell handover of the first terminal device.

9. The method according to claim 8, wherein the handover request message comprises association information between the first terminal device and the second terminal device.

10. The method according to claim 8, wherein if the second handover scheme comprises that the second terminal device is handed over from a cell covered by the first network device to a cell covered by the second network device,
the handover request message is further used for indicating that the second terminal device requests performing the second handover scheme, and the handover command further comprises a resource for cell handover of the second terminal device.

11. The method according to claim 9, wherein if the second handover scheme comprises that the second terminal device reselects a cell covered by the second network device or a cell covered by another network device as a cell to be accessed,
the handover request message is further used for indicating that the second terminal device requests performing the second handover scheme, and the handover command further comprises information on whether the second terminal device is allowed to perform cell reselection.

12. The method according to claim 11, wherein if the second network device allows the second terminal device to perform cell reselection, the handover command further comprises information of the cell to be accessed reselected by the second terminal device.

13. The method according to claim 1, wherein acquiring, by the first network device, the measurement results of the links, comprises:
receiving, by the first network device, the measurement results sent by the first terminal device; or
receiving, by the first network device, a measurement result of a link between the first terminal device and the first network device sent by the first terminal device, and receiving a measurement result of a link between the second terminal device and the first network device sent by the second terminal device.

14. The handover method according to claim 13, wherein acquiring, by the first network device, the measurement results of the links, comprises:
receiving, by the first network device, a measurement result of a link between the first terminal device and the second terminal device sent by the first terminal device or the second terminal device.

15. A handover method, comprising:
acquiring, by a first terminal device, measurement results of links, wherein the measurement results of links comprise a measurement result of a link between the first terminal device and a first network device and a measurement result of a link between the first network device and a second terminal device, wherein the links further comprise a link between the first terminal device and the second terminal device, wherein the second terminal device is a remote device, and wherein the first network device is a relay device of the second terminal device;
sending, by the first terminal device, the measurement results to the first network device, wherein the measurement results are used for the first network device to determine a first handover scheme of the first terminal device; and
receiving, by the first terminal device, a handover command and performing the first handover scheme according to the handover command.

16. The method according to claim 15, wherein the method further comprises:
acquiring, by the first terminal device, association information between the first terminal device and the second terminal device, wherein the association information comprises a pairing relationship or a connection relationship between the first terminal device and the second terminal device; and
sending, by the first terminal device, the association information to the first network device, for the first network device to determine the first handover scheme according to the association information and the measurement results.

17. The method according to claim 15, wherein acquiring, by the first terminal device, the measurement results of the links, comprises:
determining, by the first terminal device, a measurement result of a link between the first terminal device and the first network device, and receiving a measurement result of a link between the first network device and the second terminal device sent by the second terminal device.

* * * * *